(12) United States Patent
Ogino et al.

(10) Patent No.: US 7,291,361 B2
(45) Date of Patent: *Nov. 6, 2007

(54) IMAGE FORMING PROCESS, IMAGE-RECORDED ARTICLE, LIQUID COMPOSITION AND INK-JET RECORDING APPARATUS

(75) Inventors: Hiroyuki Ogino, Kanagawa (JP); Motoo Urawa, Tokyo (JP); Muneyoshi Sunada, Tokyo (JP); Yoichi Takada, Kanagawa (JP); Masanori Ito, Tokyo (JP); Hiroshi Asakawa, Kanagawa (JP); Hideki Takayama, Kanagawa (JP); Hitoshi Nagashima, Kanagawa (JP); Takashi Sawada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

This patent is subject to a terminal disclaimer.

(21) Appl. No.: 10/917,304

(22) Filed: Aug. 13, 2004

(65) Prior Publication Data

US 2005/0007436 A1  Jan. 13, 2005

Related U.S. Application Data

(62) Division of application No. 10/670,242, filed on Sep. 26, 2003, now Pat. No. 6,848,781.

(30) Foreign Application Priority Data

Sep. 30, 2002 (JP) ............................ 2002-287619
Sep. 30, 2002 (JP) ............................ 2002-287624

(51) Int. Cl.
*B05D 5/00* (2006.01)
*B05D 1/36* (2006.01)

(52) U.S. Cl. ....................... 427/258; 427/333; 427/334

(58) Field of Classification Search ...................... None
See application file for complete search history.

(56) References Cited

U.S. PATENT DOCUMENTS

| | | | |
|---|---|---|---|
| 4,045,399 A | 8/1977 | Suzuki et al. ............... 260/29.6 |
| 4,126,594 A | 11/1978 | Peters et al. ............... 260/29.4 |
| 4,732,786 A * | 3/1988 | Patterson et al. ............ 427/261 |
| 5,620,793 A | 4/1997 | Suzuki et al. ................ 428/342 |
| 5,635,291 A | 6/1997 | Yoshino et al. ........... 428/304.4 |
| 5,695,820 A | 12/1997 | Davis et al. .................... 347/96 |
| 5,792,249 A | 8/1998 | Shirota et al. ............... 347/100 |
| 5,800,916 A | 9/1998 | Yoshino et al. .............. 428/328 |
| 5,846,647 A | 12/1998 | Yoshino et al. .............. 428/328 |
| 5,851,654 A | 12/1998 | Yoshino et al. .............. 428/328 |
| 5,869,177 A | 2/1999 | Yoshino et al. .............. 428/328 |
| 5,962,124 A | 10/1999 | Yoshino et al. .............. 428/328 |
| 5,985,975 A * | 11/1999 | Kurabayashi et al. ........ 524/462 |
| 6,188,850 B1 | 2/2001 | Sakaki et al. ................... 399/1 |
| 6,341,854 B1 | 1/2002 | Takemoto .................... 347/101 |
| 6,500,525 B1 | 12/2002 | Ogino et al. ................. 428/195 |
| 6,538,047 B1 | 3/2003 | Miyabayashi ................. 347/96 |
| 2002/0012629 A1 | 1/2002 | Yoshino et al. .............. 423/625 |
| 2003/0018120 A1 | 1/2003 | Lee et al. ..................... 524/543 |
| 2003/0064206 A1 | 4/2003 | Koyano et al. .............. 428/195 |
| 2004/0104986 A1 | 6/2004 | Nito et al. ..................... 347/96 |
| 2004/0119800 A1 | 6/2004 | Takada et al. ................. 347/96 |

FOREIGN PATENT DOCUMENTS

| | | |
|---|---|---|
| EP | 1 231 245 | 8/2002 |
| EP | 1 231 245 A1 | 8/2002 |
| EP | 1 231 245 A1 * | 8/2006 |
| JP | 7-232475 A | 9/1995 |
| JP | 10-315448 A | 12/1998 |
| JP | 2000-225695 A | 8/2000 |
| JP | 2001-158092 A | 6/2001 |
| JP | 2002-254796 A | 9/2002 |

* cited by examiner

*Primary Examiner*—William Phillip Fletcher, III
(74) *Attorney, Agent, or Firm*—Fitzpatrick, Cella, Harper & Scinto

(57) ABSTRACT

Disclosed herein is an image forming process for forming an image-recorded article having a coating layer on at least a part of an image formed, which comprises the steps of providing a liquid composition containing a polymer, providing an image-recorded article formed on a recording medium by an ink-jet recording method, and applying the liquid composition to at least a part of an image of the recorded article to insolubilize the polymer contained in the liquid composition on the surface of the image, thereby forming the coating layer at a position to which the liquid composition has been applied, wherein the recording medium has a surface which insolubilizes the polymer.

4 Claims, 4 Drawing Sheets

IMAGE FORMING PROCESS, IMAGE-RECORDED ARTICLE, LIQUID COMPOSITION AND INK-JET RECORDING APPARATUS

This is a divisional application of application Ser. No. 10/670,242, filed Sep. 26, 2003, now U.S. Pat. No. 6,848,781.

BACKGROUND OF THE INVENTION

1. Field of the Invention

The present invention relates to an ink-jet recording process and an image-recorded article, and a liquid composition and an ink-jet recording apparatus used in the formation thereof.

2. Related Background Art

An ink-jet recording system is a system that minute droplets of an ink are ejected by any of various kinds of operation principles to apply them to a recording medium such as paper, thereby recording images, characters, etc., and has been rapidly spread in various application fields including information instruments as recording apparatus of various images in recent years because of possible high-speed recording, slight noise, easy color recording, high flexibility of recording patterns, needlessness of development and fixing, and the like. In addition, an image formed by a multi-color ink-jet system is about to be widely applied to a field of recording full-color images because recording comparable with multi-color printing of a plate system and prints by a color photography system can be provided, and such an image is cheaper than those by the ordinary multi-color printing and color photography system when the number of copies is small.

On the other hand, recoding media having a coating layer using an alumina hydrate of a boehmite structure have been proposed. A typical example thereof is described in, for example, Japanese Patent Application Laid-Open No. H7-232475.

These recording media using the alumina hydrate have such merits that fixing of a dye in an ink is good to provide an image having good coloring, and such recording medium are preferred to the conventional recording media from the viewpoints of image quality of a resulting image, particularly, image quality of a full-color image, and gloss because the alumina hydrate has a positive charge.

Under the circumstances, however, an image obtained by using such dye ink and recording medium using the alumina hydrate described above may not have satisfactory performance as to resistance (gas resistance) to deterioration by a substance such as ozone gas in air in particular from the viewpoint of retaining the image quality of a high-quality image formed for a long period of time though it has image quality comparable with or superior to a silver salt print.

As a technique intended to improve the image durability of a resulting recorded article, it is disclosed to provide a protective layer on the surface of a recording medium after the formation of an image. For example, Japanese Patent Application Laid-Open No. 2001-158092 discloses a process for laminating various kinds of plastic films as a protective film on an image-recorded article.

Japanese Patent Application Laid-Open No. H10-315448 describes a process in which fine particles composed of a thermoplastic polymer are contained in an ink-receiving layer of a recording medium in advance, printing is performed in such a state that the ink absorbency is kept, and the fine particles are then melted or dissolved by heat or a solvent to form a resin film as a protective film on the surface of the recording medium.

Japanese Patent Application Laid-Open No. 2000-225695, as an example where the same system as an image forming method is used as a means for forming a coating layer, discloses a method for forming a coating layer by ejecting an auxiliary liquid containing a resin having a film-forming function, such as an emulsion, by an ink-jet system. Japanese Patent Application Laid-Open No. 2002-254796 describes that overcoating or undercoating is applied with a treatment solution containing an imidated styrene-maleic anhydride polymer by an ink-jet system.

SUMMARY OF THE INVENTION

However, the processes disclosed in Japanese Patent Application Laid-Open No. H10-315448 and the like require to separately provide a laminator or an apparatus for melting or dissolving the fine particles composed of the thermoplastic polymer in addition to an image forming apparatus though the gas resistance is surely improved, and involve such problems that running cost is increased, and the whole apparatus is large-scaled.

On the other hand, when such a resin having self-film-coating property like emulsion as described in Japanese Patent Application Laid-Open No. 2000-225695 is contained in the liquid for ejection, solidification (clogging at an orifice) may be easy to be caused by leaving it to stand for a long period of time at a minute orifice.

When the treatment solution is applied after penetration of an ink into a recording medium in a system that the ink is reacted with the treatment solution as described in Japanese Patent Application Laid-Open No. 2002-254796, no film is formed on the surface of the recording medium because the ink penetrated into the recording medium reacts with the polymer, so that sufficient fastness properties for image may not be achieved in some cases. When the treatment solution is applied before the penetration of the ink into the recording medium, mist is generated, so that clogging at an orifice may be caused by reaction of the mist of the treatment solution with the ink in some cases.

The present invention has been made with a view toward solving the above-described problems and has as an object the provision of a process for forming an image-recorded article, by which an image-recorded article excellent in image quality, gas resistance and rub-off resistance can be provided by forming a coating layer on at least a part of an image to be formed, occurrence of clogging at an orifice in an ink-jet recording apparatus due to use of a liquid for forming the coating layer can be prevented, and an image-recorded article excellent in image quality, gas resistance and rub-off resistance can be formed by forming a coating layer even by a miniaturized apparatus.

Another object of the present invention is to provide an image-recorded article excellent in image quality, gas resistance and rub-off resistance.

A further object of the present invention is to provide a liquid composition for forming a coating layer used in the process for forming an image-recorded article, and a recording apparatus using it.

The above objects can be achieved by the present invention described below.

According to the present invention, there is thus provided an image forming process for forming an image-recorded article having a coating layer on at least a part of an image formed, which comprises the steps of providing a liquid composition containing a polymer, providing an image-recorded article formed on a recording medium by an ink-jet recording method, and applying the liquid composition to at least a part of an image of the recorded article to insolubilize the polymer contained in the liquid composition on the surface of the image, thereby forming the coating layer at a position to which the liquid composition has been applied, wherein the recording medium has a surface which insolubilizes the polymer.

According to the present invention, there is also provided an image forming process for forming an image-recorded article having a coating layer on an image formed, which comprises the steps of providing a liquid composition containing an aqueous medium and a polymer having a structure represented by a general formula

—COOA     (1)

wherein A is an alkali metal, ammonium or an organic ammonium, providing an image-recorded article formed on a recording medium having a surface pH which insolubilizes the polymer by an ink-jet recording method, and applying the liquid composition to the recorded article to form the coating layer on the image-recorded article.

According to the present invention, there is further provided an image forming process for forming an image-recorded article having a coating layer on an image formed, which comprises the steps of providing a liquid composition containing an aqueous medium and a polymer having a structure represented by a general formula

—COOA     (1)

wherein A is an alkali metal, ammonium or an organic ammonium, providing an image-recorded article formed on a recording medium containing a polyvalent metal ion which insolubilizes the polymer by an ink-jet recording method, and applying the liquid composition to the recorded article to form the coating layer on the image-recorded article.

According to the present invention, there is still further provided a liquid composition for forming a coating layer on at least a part of an image-recorded article formed on a recording medium by an ink-jet recording method, which comprises an aqueous medium and a polymer having a structure represented by a general formula

—COOA     (1)

wherein A is an alkali metal, ammonium or an organic ammonium, wherein the polymer is dissolved in the aqueous medium in such a state as to be insolubilized by the surface pH of the recording medium.

According to the present invention, there is yet still further provided a liquid composition for forming a coating layer on at least a part of an image-recorded article formed on a recording medium by an ink-jet recording method, which comprises an aqueous medium and a polymer having a structure represented by a general formula

—COOA     (1)

wherein A is an alkali metal, ammonium or an organic ammonium, wherein the polymer is dissolved in the aqueous medium in such a state as to be insolubilized by a polyvalent metal ion contained in the recording medium.

According to the present invention, there is yet still further provided an ink-jet recording apparatus comprising a liquid holding part for holding a liquid therein and a liquid ejecting part for ejecting the liquid fed from the liquid holding part, wherein the liquid is any of the liquid compositions described above.

According to the present invention, there is yet still further provided an image-recorded article obtained by any of the image forming processes described above.

In the present invention, the polymer contained in a dissolved state in the liquid composition applied to at least a part of the image is insolubilized on the surface of the image to form a coating layer. This coating layer can bring about an effect of improving the image quality and impart good gas resistance and rub-off resistance to the image. Incidentally, the position of the coating layer formed on the image is not limited to a colored portion by a coloring material such as a dye, but may be on a non-colored portion alone.

DETAILED DESCRIPTION OF THE INVENTION

Figure 1:
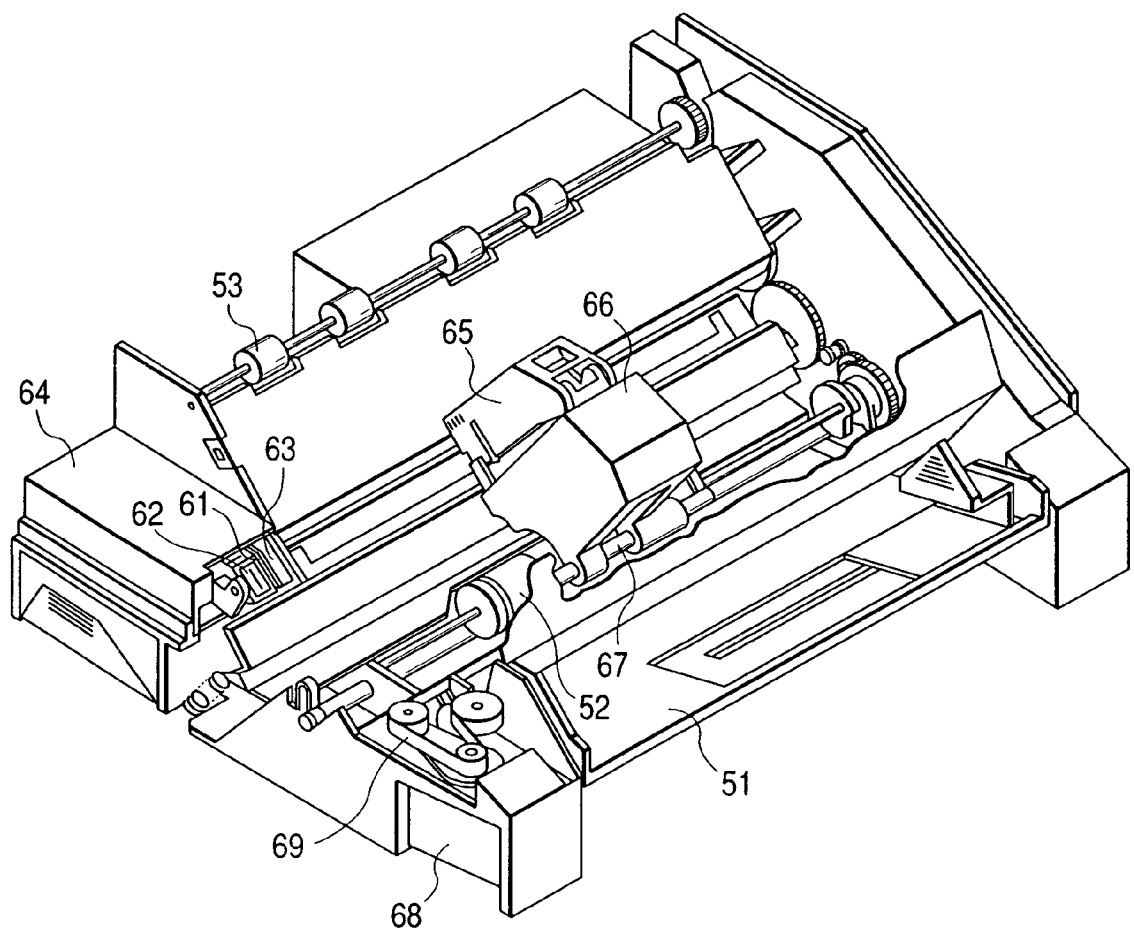
FIG. 1 is a perspective view illustrating an exemplary ink-jet recording apparatus.

The image forming process according to the present invention will hereinafter be described in details.

(Recording Method)

A polymer contained in a liquid composition for forming a coating layer in the present invention is dissolved in an aqueous medium and is insolubilized on the surface of a recording medium on which an image has been formed. A preferred embodiment thereof is a mode that the liquid composition contains a polymer having a structure represented by a general formula

—COOA     (1)

wherein A is an alkali metal, ammonium or an organic ammonium, and the polymer is insolubilized on the surface of a recording medium on which an image has been formed. More specifically, a liquid composition prepared at a pH higher than that of the surface of the recording medium is applied on to the recording medium having a pH lower than that of the liquid composition, on which an image has been formed, thereby forming a coating film owing to insolubilization of the polymer in the liquid composition. Alternatively, the polymer in the liquid composition may be insolubilized in a moment on a recording medium, which has been prepared at a polyvalent metal ion concentration at which the polymer is insolubilized, and on which an image has been formed, thereby forming a coating layer. In other words, the polymer in the liquid applied on the image is insolubilized in a moment on the image by either process, whereby the polymer and aqueous medium (solvent component) undergo solid-liquid separation, and the aqueous medium component is further absorbed into the recording medium on which the image has been formed, thereby forming the coating layer composed of the insolubilized polymer on the image.

The present inventors consider the reason why a recorded image free of stickiness after formation of the coating layer and good in image quality, gas resistance and rub-off resistance can be obtained by the image forming process according to the present invention to be as follows. When a recording liquid containing a coloring material is ejected by an ink-jet recording method to make a record of an image, and the liquid composition for forming the coating layer is applied to at least a part of the image formed on a recording medium having a surface which insolubilizes the polymer contained in the liquid composition when the liquid composition comes into contact therewith, the polymer is insolubilized in a moment by an action with the surface of the recording medium to undergo solid-liquid separation, so that only the solvent component is absorbed into the recording medium to form the coating layer on the image. By the formation of this coating layer, the recorded image is protected from various physical or chemical changes, whereby high gas resistance and image density are imparted to the recorded image. In addition, even when the coating layer is formed at a non-colored portion on the image, effects such as prevention of staining are brought about. Preferable examples of the action with the surface of the recording medium for insolubilizing the polymer include (1) an action by pH, (2) an action by a polyvalent metal ion and (3) an action by combination of both actions (1) and (2) of a polymer having a structure (hereinafter referred to as "carboxylate") represented by —COOA (1), wherein A is an alkali metal, ammonium or an organic ammonium.

Specifically, according to the action (1) by the pH, the liquid composition for forming the coating layer is applied on to an image formed on a recording medium having a surface pH which insolubilizes the polymer in the liquid composition by an ink-jet recording system or any of various ink-coating systems, so that a counter ion of the carboxylate in the polymer is eliminated by an acid possessed by the recording medium, on which the image has been formed, to protonize the polymer, whereby the polymer is insolubilized and cohered to form a thin film having high crystallinity.

Specifically, according to the action (1) by the polyvalent metal ion, the polymer-containing liquid composition for forming the coating layer is applied on to a recording medium having a surface, which has been prepared at a polyvalent metal ion concentration at which the polymer dissolved in the liquid composition is insolubilized, by an ink-jet recording system or any of various ink-coating systems after recording of an image, so that a counter ion of the carboxylate in the polymer dissolved in the liquid composition is eliminated by a polyvalent metal ion in an ink-receiving layer, so as to associate molecules of the polymer with each other through the polyvalent metal ion, whereby the polymer is insolubilized and cohered to form a thin film having high crystallinity. By these actions, the recorded image is protected from various physical or chemical changes, whereby high fastness properties to gases are imparted to the recorded image.

The thickness of the coating layer formed on the image in the present invention is determined by the amount of the polymer in the liquid composition and the amount of the liquid composition applied per unit area. A preferable thickness of the coating layer is a range of from 50 to 10,000 nm. If the thickness of the coating layer exceeds the upper limit of this range, the haze of the recorded image is increased by the presence of such a coating layer, so that the image may become such a state as to be covered with a white mist in some cases. In addition, the presence of the film itself may be recognized to deteriorate the quality as a recorded article. If the thickness of the coating layer is smaller than the lower limit of this range, sufficient gas barrier properties may not be achieved in some cases. When an ink-jet system is used as a coating means of the liquid composition, a range of from 50 to 1,000 nm may be mentioned as a more preferable range of the thickness of the coating layer. If the thickness of the coating layer exceeds the upper limit of this range, the solid concentration of the polymer in the liquid composition, which will be described subsequently in detail, must be raised, so that problems may be involved from the viewpoints of crusting properties and ejection stability in some cases.

In the present invention, a constitution that a layer composed of the polymer insolubilized by being impregnated into a surface layer of an image surface is integrated with the coating layer located on the image surface may be mentioned as a preferred mode. A layer impregnated with the polymer is formed in the interior of the surface layer of the recording medium, whereby deterioration of gas resistance by slight flaws or cracks caused in the surface coating layer upon excess scratching or bending can be improved. The thickness of the impregnated layer formed in the interior at this time is preferably a range of from 0.2 to 10 μm from the surface side. If the thickness of the impregnated layer within the recording medium exceeds the upper limit of this range, the quality of the image formed may be deteriorated by haze or white mist in some cases. If the thickness is smaller than the lower limit of this range, the effect by the impregnated layer formed in the interior of the recording medium may not be achieved in some cases.

Incidentally, the thicknesses of the coating layer and impregnated layer in the present invention can be measured by observation of a section of the recorded article through a scanning electron microscope.

In the present invention, no particular limitation is imposed on a means for applying the liquid composition for forming the coating layer, which will be described subsequently, on to the image, and a general coating method by a roll coater, reverse roll coater or the like or an ink-jet recording method in the same manner as in a recording liquid containing a coloring material may be used. The liquid composition can be applied on to the recording medium, on which an image has been already formed, by any of these applying means. When the ink-jet recording method is used, a coating-layer-forming site may be the whole or only a part of a colored portion (portion colored with a coloring material) of the image formed on the recording medium, the whole or a part of the image including the colored portion and a portion (non-colored portion) not colored, or the whole or only a part of the non-colored portion of the image. In particular, the use of the ink-jet recording method makes easy the control of a position applied and the formation of a thinner and more uniform coating layer. In addition, a separate provision of a unit for forming the coating layer is made needless by adding a nozzle for the liquid composition to an ink-jet recording head because the method is the same as in the formation of the image, so that the miniaturization of the whole apparatus is feasible.

The absorptivities of the liquid composition and recording liquid in the recording medium in the present invention are preferably within the following ranges, respectively. With respect to the absorptivity of the liquid composition in the recording medium, the absorption coefficient, $K_\alpha 1$ from 0.025 seconds to 0.1 seconds in the Bristow method prescribed in JAPAN TAPPI No. 51 is preferably within a range of from 0.5 to 1.5 (ml·m$^{-2}$·msec$^{-1/2}$). If $K_\alpha 1$ is smaller than 0.5, drying of the coating layer formed may become insufficient to leave stickiness. If $K_\alpha 1$ is greater than 1.5, coloring property of the recording liquid may be lowered in some cases. The cause that the coloring property is lowered is considered to be attributable to the fact that a coloring material forming an image is pushed out on the back side of the recording medium in a thickness-wise direction thereof with the penetration of a solvent in the liquid composition. The absorption coefficient of the liquid composition in the recording medium can be controlled by the kind and concentration of such a polymer contained in the liquid composition as described below, the content of the carboxylate, the kind of the solvent, the pore diameter and surface pH of a portion of the recording medium, in which an ink is received, and the like.

With respect to the absorptivity of the recording liquid in the recording medium, the absorption coefficient, $K_\alpha 2$ from 0.025 seconds to 0.1 seconds in the Bristow method prescribed in JAPAN TAPPI No. 51 is preferably within a range of from 1.0 to 3.0 (ml·m$^{-2}$·msec$^{-1/2}$). When $K_\alpha 2$ falls within the range of from 1.0 to 3.0 (ml·m$^{-2}$·msec$^{-1/2}$), such excellent effects that good coloring ability is achieved, beading (aggregation of a dye due to insufficient absorption speed) is prevented, lowering of the coloring ability and image disorder are prevented even when a time difference between recording with the recording liquid containing a coloring material by an ink-jet recording method and application of the liquid composition is short can be brought about. The absorption coefficient of the recording liquid in the recording medium can be controlled by the kind and concentration of such a coloring material as described below, the kind of the solvent, addition of a surfactant, the pore diameter of a portion of the recording medium, in which an ink is received, and the like.

In the present invention, a ratio, $K_\alpha 1/K_\alpha 2$ of both absorption coefficients is preferably 0.8 or smaller. When the ratio is 0.8 or smaller, the effect of preventing lowering of the coloring ability and image disorder can be brought about even when a time difference between recording with the recording liquid containing a coloring material by an ink-jet recording method and application of the liquid composition is short is made excellent.

(Liquid Composition)

The liquid composition for forming the coating layer in the present invention will now be described. The polymer contained in the liquid composition is preferably a polymer having a carboxylate. The polymer having the carboxylate may be any polymer so far as it is stably dissolved in the liquid composition and can be insolubilized by the action by the surface pH of the recording medium, the action by the polyvalent metal ion contained in the recording medium or the combined action thereof to form a stable layer. For example, a polymer with a vinyl copolymer obtained by using at least one of acrylic monomers such as acrylic acid, methacrylic acid, maleic acid, a half ester of maleic acid and itaconic acid solubilized with a basic substance is preferred.

No particular limitation is imposed on the basic substance at this time. Examples thereof include hydroxides of alkali metals, such as lithium hydroxide, sodium hydroxide and potassium hydroxide, aqueous ammonia, monoethanolamine, diethanolamine, triethanolamine, monoisopropanolamine, diisopropanolamine, triisopropanolamine, morpholine, aminomethylpropanol, aminomethylpropanediol, and aminoethylpropanediol.

The fact that the polymer has the carboxylate structure represented by —COOA (1), wherein A is an alkali metal, ammonium or an organic ammonium, can be confirmed by the following method.

Namely, this fact can be confirmed by whether absorption based on the C=O antisymmetric stretching vibration of a carboxylate is present at from 1550 to 1610 cm$^{-1}$ in infrared spectrum or not.

Further, the kind of salt of the carboxylate may be identified by ion chromatography, and the kind of salt of the carboxylate can be identified from the retention time characteristic of a counter ion of the carboxylate.

No particular limitation is imposed on a monomer copolymerizable with the acrylic monomer so far as it can form a polymer having the intended properties. For example, at least one of the following monomers may be used. Namely, such monomers include (meth)acrylate monomers such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, n-octyl (meth)acrylate, decyl (meth)acrylate and dodecyl (meth)acrylate. In order to obtain a coating film having a higher gas barrier property, a vinyl copolymer having a unit composed of a monomer containing an aromatic alkyl group or alicyclic alkyl group having optional carbon atoms, preferably 7 to 26 carbon atoms is more preferred. Examples of such monomers include styrene, benzyl(meth)acrylate, 2-anthryl(meth)acrylate, 2-(benzoyloxy)-ethyl(meth)acrylate, 2-(5-ethyl-2-pyridyl)ethyl(meth)acrylate, [1,1'-biphenyl]-4-yl(meth)acrylate, 7-oxo-1,3,5-cycloheptatoluen-1-yl(meth)acrylate, 8-quinolyl(meth)acrylate, cyclohexyl(meth)acrylate, cyclododecyl(meth)acrylate, 1-methylhexyl(meth)acrylate, 1-methylheptyl(meth)acrylate, 2-methylpentyl(meth)acrylate, 1-cyclohexyl-3-azetidinyl(meth)acrylate, 9-carbazolyl-methyl(meth)acrylate, tetrahydro-2H-pyran-2-yl(meth)acrylate, 3-nitrophenyl (meth)acrylate, 1-(3-pellirenyl)ethyl (meth)acrylate and (3-methyloxiranyl)methyl(meth)acrylate. At least one selected from these monomers may be used.

The counter ion (A in the general formula (1)) in the present invention includes alkali metals, ammonium and organic ammonium, and at least one selected from these may be used. Examples of the alkali metals include lithium, sodium, potassium and rubidium. Examples of the organic ammonium include alkylammonium and alkanolammonium such as monoethanolammonium, diethanol-ammonium, triethanolammonium, monoisopropanolammonium, diisopropanolammonium, triisopropanolammonium, monomethylammonium, dimethylammonium, trimethylammonium, monoethylammonium, diethylammonium and triethylammonium.

In the present invention, at least 2 polymers, which are different in behavior of insolubilization from each other, among these water-soluble polymers are preferably contained in the liquid composition for the purpose of forming an impregnated layer composed of a polymer impregnated into the surface layer of the recording medium, on which an image has been formed, and insolubilized there under the coating layer together with the coating layer formed on the surface. These 2 polymers are preferably a combination of (1) at least one of vinyl copolymers composed of a monomer having an aromatic alkyl group or alicyclic alkyl group and an acrylic monomer and (2) at least one of vinyl copolymers composed of a monomer containing neither aromatic alkyl group nor alicyclic alkyl group and an acrylic monomer. Such at least 2 water-soluble polymers are contained, whereby layers each formed mainly of an insolubilized polymer can be provided on the surface of the recording medium and in the interior of the surface layer, respectively. The integral provision of the layers formed of the respective polymers on the surface and in the interior of the surface layer permits retaining the sufficient gas barrier property even upon excess scratching or bending.

The reason why the layers can be formed on the surface of the recording medium and in the interior of the surface layer by the combination of such polymers are not clearly known. However, the present inventors consider it to be as follows. A state at the time the polymer in the liquid composition is insolubilized greatly participates in the formation of the coating layer. When the polymer is deposited as a bulky solid upon insolubilization due to its own hydrophobicity, crystallinity or the like, the coating layer is formed on the surface of the recording medium, and not formed in the interior of the recording medium. When the polymer is deposited as a finely particulate dispersion upon the insolubilization on the other hand, the coating layer is also impregnated into the interior of the surface layer of the recording medium to form a layer. More specifically, the vinyl copolymer composed of a monomer having an aromatic alkyl group or alicyclic alkyl group and an acrylic monomer is easy to form a coating layer on the surface of the recording medium, while the vinyl copolymer composed of a monomer containing neither aromatic alkyl group nor alicyclic alkyl group and an acrylic monomer is easy to form an impregnated layer in the interior of the recording medium. It is thus considered that the combined use of these 2 polymers permits forming the coating layer on the surface and in the interior of the recording medium.

The molecular weight of the polymer having the carboxylate according to the present invention is within a range of, for example, from 1,000 to 100,000, preferably from 1,000 to 50,000 in terms of a weight average molecular weight before addition of the basic substance. If the weight average molecular weight exceeds 100,000, the resulting liquid composition tends to have a higher viscosity, and so a uniform film may be hard to be provided in some cases. If the weight average molecular weight is lower than 1,000 on the other hand, any coating layer having a sufficient gas barrier property may not be provided in some cases. The weight average molecular weight in the present invention is a value in terms of a polystyrene in a mixed solvent of THF/DMF by means of GPC (gel permeation chromatography).

In the present invention, the content of the carboxylate in the polymer varies according to the kind and concentration of the polyvalent metal ion contained in a recording medium used, the surface pH and surface condition of the recording medium, and the kinds of monomers forming the polymer, and is suitably selected so as to be insolubilized on the recording medium to form a coating layer. For example, when the coating layer is formed by the action with the polyvalent metal ion, the concentration of the carboxylate is adjusted in such a manner that when the liquid composition containing the polymer having the carboxylate is added dropwise to an aqueous solution of a polyvalent metal ion concentration corresponding to the concentration of the polyvalent metal ion contained in the ink-receiving layer of the recording medium, the polymer in the liquid composition is insolubilized and deposited.

The acid value of the polymer having the carboxylate according to the present invention is preferably from 50 to 300 when, for example, a (meth)acrylic copolymer is used. If the acid value is lower than 50, a problem may arises from the viewpoint of the crusting property. When a thermal ink-jet system is used in particular, such polymer may form the cause of scorch on a heater so as not to achieve stable ejection properties. If the acid value exceeds 300 on the other hand, insolubilization on the recording medium becomes hard to occur, so that the surface pH of the recording medium must be extremely lowered, and the tint of an image formed may become a problem in some cases. The acid value in the present invention is measured by a measuring method according to JIS K 0070.

The glass transition point (Tg) of the polymer having the carboxylate according to the present invention is preferably within a range from −50 to 130° C., more preferably from −40 to 130° C., still more preferably from −20 to 120° C. The Tg satisfies this range, whereby a sticky feel of the coating layer is reduced, and deterioration of gas resistance by cracking or the like caused by bending or the like of the coating layer can be prevented.

As a production process of the polymer contained in the liquid composition, may be used an ordinary radical polymerization process, and bulk polymerization, suspension polymerization, emulsion polymerization or the lime may be used. The polymerization is preferably conducted at a raw monomer concentration ranging from 15.0 to 35.0% by mass. In this case, a general radical polymerization initiator may be used as a polymerization initiator. Among others, an azo compound or peroxide compound is preferred.

A monomer having various functions may be contained in the polymer according to the present invention in addition to the above-described monomers as needed. For example, a monomer having ultraviolet absorbency may preferably be contained because the light fastness of a recorded article obtained in the present invention can be greatly improved.

No particular limitation is imposed on the monomer having the ultraviolet absorbency so far as it has an effect of absorbing ultraviolet rays. However, a monomer containing a benzotriazole compound, benzophenone compound or hindered amine compound is suitable. Specifically, at least one of the following monomers may be used. Namely, the monomers include 2(2'-hydroxy-5'-methacryloxyethylphenyl)-2H-benzotriazole, 2-hydroxy-5-methacryloxyethyl-4-methoxybenzophenone and 2-hydroxy-5-methacryloxyethyl-4-octyloxybenzophenone.

The pH of the liquid composition according to the present invention is adjusted by the amount of the basic substance added or with a pH adjustor or the like and must be a pH required that the polymer having the carboxylate is solubilized in water. A preferred pH of the liquid composition is within a range of from 5.4 to 11.0. If the pH of the liquid composition exceeds 11.0, a problem may arise on durability of members coming into contact with such a liquid composition, such as a head. If the pH of the liquid composition is lower than 5.4, the surface pH of the recording medium must be extremely lowered, or the polyvalent metal ion concentration of the recording medium must be extremely raised, which will be described subsequently. As a result, the tint of the resulting image may become a problem. When the means for insolubilizing the polymer is owing to the action by pH, a difference between the pH of the liquid composition and the surface pH of the recording medium, which will be described subsequently, is preferably 0.5 or greater, more preferably 1.0 or greater.

The content of the polymer having the carboxylate in the liquid composition is preferably, for example, 1.0 to 15.0% by mass, in terms of a proportion before addition of the basic substance and the like, based on the whole mass of the liquid composition. If the content of the polymer in the liquid composition exceeds 15.0% by mass, such a liquid composition tends to have a higher viscosity, and so crusting may become a problem in some cases. If the content is lower than 1.0% by mass on the other hand, any coating layer having sufficient gas barrier properties may not be provided in some cases. A content ranging from 1.0 to 6.0% by mass is particularly preferred.

As the solvent used in the liquid composition in the present invention, may be used an aqueous medium. As the aqueous medium, may be used water alone or a mixed solvent of water and an water-soluble organic solvent. A particularly preferred solvent is a mixed solvent composed of water and a water-soluble organic solvent and containing a polyhydric alcohol having an anti-drying effect on an ink as the organic solvent. As the water, it is preferable to use deionized water instead of tap water containing various ions.

Examples of the water-soluble organic solvent used in combination with water include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol methyl (or ethyl) ether, diethylene glycol methyl (or ethyl) ether and triethylene glycol monomethyl (or monoethyl) ether; N-methyl-2-pyrrolidone; and 1,3-dimethyl-2-imidazolidinone. At least one of these solvents may be used.

Among these water-soluble organic solvents, polyhydric alcohols such as diethylene glycol, and lower alkyl ethers of polyhydric alcohols, such as triethylene glycol monomethyl (or monoethyl) ether are preferred.

The content of the water-soluble organic solvent in the liquid composition may be suitably selected within a range of, for example, from 0 to 90% by mass, preferably from 5 to 70% by mass, in terms of a proportion before addition of the basic substance and the like, based on the whole mass of the liquid composition, while the content of water may be suitably selected within a range of, for example, from 9 to 99% by mass, preferably from 50 to 95% by mass, in terms of a proportion before addition of the basic substance and the like, based on the whole mass of the liquid composition.

A surfactant may be contained in the liquid composition. In particular, a surfactant containing ethylene oxide is preferably contained in the liquid composition.

When the surfactant containing ethylene oxide is contained in the liquid composition, lowering of the gas barrier property is prevented, and the ejection property of the resulting liquid composition when ejected from an ink-jet recording apparatus of a thermal system can be improved.

The reason why the lowering of the gas barrier property can be prevented is considered to be attributable to the fact that the surfactant containing ethylene oxide is adsorbed on the polymer having the carboxylate, and the solubility of the polymer in water is enhanced. Therefore, the liquid composition, to which the surfactant containing ethylene oxide has been added, suitably controls rapid insolubilization to increase a leveling property, so that grain boundaries become hard to occur to provide a coating layer having a high gas barrier property. The reason why the ejection property can be improved is considered to be as follows. When the (meth)acrylic copolymer having a low acid value is ejected from an ink-jet recording apparatus of a thermal system in particular, insolubilization or the like occurs on a heater of a recording head by heat upon bubbling due to its low solubility in water, and normal bubbling is prevented by the insoluble matter occurred at this time. It is however considered that the addition of the surfactant containing ethylene oxide enhances the solubility of the polymer in water to make the polymer hard to be insolubilized, and redissolution is caused by refilling of an ink after the ejection even when the insolubilization occurs, so as to normally conduct bubbling.

The surfactant containing ethylene oxide preferably used in the present invention may be any surfactant so far as it has at least 5 ethylene oxide chains. Specific examples thereof include polyoxyethylene lauryl ether, polyoxyethylene cetyl ether, polyoxyethylene stearyl ether, polyoxyethylene oleyl ether, polyoxyethylene nonyl phenyl ether, polyoxyethylene octyl phenyl ether, polyoxyethylene stearylamine and block copolymers of ethylene oxide and propylene oxide. At least one of these surfactants may be used. However, the present invention is not limited thereby. It is only necessary for the surfactant to have at least 5 ethylene oxide chains. However, the length of the ethylene oxide chain is preferably within a range of from about 5 to 50 for practicing the present invention. A more preferable range is from 10 to 50. If the ethylene oxide chains of the surfactant used is less than 5, such a surfactant involves a problem that it is not soluble in water. If the ethylene oxide chains of the surfactant used is more than 50 on the other hand, reejection property after suspending of the resulting liquid composition may be deteriorated in some cases.

The amount of the surfactant containing ethylene oxide used is 0.01 to 20% by mass, preferably 0.1 to 5% by mass. If the amount is less than the lower limit of this range, the effect by this surfactant is hard to be brought about. If the amount exceeds the upper limit of this range, the reejection property after suspending of the resulting liquid composition may be deteriorated in some cases.

In order to improve the light fastness of a resulting recorded article when forming the coating layer of the liquid composition, it is preferable that the maximum absorption wavelength $\lambda_{max}$ of the UV absorption spectrum of the coating layer be present at 400 nm or shorter, and the absorption coefficient "e" in the maximum absorption wavelength $\lambda_{max}$ represented by the following equation be from 0.1 to 6.0.

$$A = e \cdot C$$

wherein A is an absorbance in the maximum absorption wavelength $\lambda_{max}$ of the coating layer, and C is a film thickness (μm) of the coating layer When the absorption coefficient "e" of the coating layer falls within a range of from 0.1 to 6.0, the light fastness of the recorded article can be improved while keeping the coating layer colorless and transparent.

In order to make the absorbance of the coating layer within the above-described range, it is effective to contain such a monomer having ultraviolet absorbency as described above in the polymer used. However, it may be adjusted by containing an ultraviolet absorbent in the liquid composition as needed. To the liquid composition according to the present invention, a viscosity modifier, a surface tension modifier, a pH adjustor, a mildewproofing agent, a rust-preventing agent, an antioxidant and/or the like may be added in addition to the above-described components, as needed.

A coloring material may be contained in the liquid composition according to the present invention for purposes of, for example, ornament (insertion of logo or the like with a pale blue color). In this case, the coloring material is present in the coating layer, so that the gas resistance (of the logo or the like) is somewhat poor compared with the coloring material present in the ink-receiving layer. Accordingly, the concentration of the coloring material in the liquid composition is preferably 0.5% by mass or less, more preferably 0.2% by mass or less.

(Recording Medium)

The recording medium used in the present invention will now be described. In the present invention, the polymer in the liquid composition for forming the coating layer is insolubilized on an image-forming surface of a recording medium as described above. When the insolubilization of the polymer is caused by the action by pH, the surface pH (for example, concentration of an acid) of the recording medium must be controlled to a value required to insolubilize the polymer in the liquid composition. A specific surface pH of the recording medium may be suitably selected according to the polymer used in the liquid composition. However, a preferable range of the surface pH is from 4.0 to 7.0, more preferably from 5.4 to 7.0. If the surface pH exceeds the upper limit of this range, the insolubilization of the polymer in the liquid composition on the recording medium becomes hard to occur, so that the content of the carboxylate in the polymer must be lowered. Therefore, sufficient ejection stability may not be achieved in such a liquid composition. If the surface pH is lower than the lower limit of this range, the tint of the coloring material in the resulting recorded image may be changed, bronzing may occur, or the absorbency of the recording medium to a recording liquid (dye ink) may be deteriorated.

Methods for adjusting the surface pH of the recording medium include a method, in which an aqueous solution of an acid such as nitric acid, hydrochloric acid or sulfuric acid, or an aqueous solution of an alkali such as ammonia is applied to a recording medium having a prescribed surface pH produced in advance by a publicly known process so as to give a desired surface pH, and in the case where an ink-receiving layer is formed, a method, in which a pH of a coating formulation for forming the ink-receiving layer is adjusted to a desired pH in advance, and such a coating formulation is applied to a base material and dried to form the ink-receiving layer. Incidentally, the surface pH was measured in accordance with the Surface pH Measuring Method of Paper in JAPAN TAPPI No. 49-2 (Coating Process).

When the insolubilization of the polymer is caused by the action by the polyvalent metal ion in the recording medium, the concentration of the polyvalent metal ion in the recording medium forming an image surface must be controlled to a value required to insolubilize the polymer in the liquid composition. It is preferable to use a recording medium having an ink-receiving layer and contain the polyvalent metal ion in the ink-receiving layer. In this case, a specific concentration of the polyvalent metal ion in the recording medium may be suitably selected according to the polymer used in the liquid composition. However, a preferable range of the polyvalent metal ion concentration in the ink-receiving layer is from 0.01 to 1.0 (mol/l), more preferably from 0.04 to 0.8 (mol/l). If the concentration of the polyvalent metal ion concentration in the ink-receiving layer is less than 0.01 mol/l, the acid value of the polymer must be lowered for the purpose of insolubilizing the polymer in the liquid composition on the recording medium, so that sufficient ejection stability may not be achieved in such a liquid composition. If the concentration of the polyvalent metal ion in the ink-receiving layer exceeds 1.0 mol/l on the other hand, the tint and light fastness of the resulting recorded image and the absorbency of the recording medium to a recording liquid (dye ink) may be deteriorated.

The concentration of the polyvalent metal ion in the ink-receiving layer in the present invention is determined in accordance with the equation Polyvalent metal ion concentration (mol/l)=W/VP wherein W and VP denote a content (mol/g) of the polyvalent metal ion per gram of the ink-receiving layer and a void volume (ml/g) per gram of the ink-receiving layer, respectively.

W in the above equation can be measured by suitably taking the ink-receiving layer out of the recording medium and using a fluorescence X-ray measuring device or the like. VP is determined from a volume (V1 (ml/m2)) of the ink-receiving layer per unit area on the recording medium, a mass (H1 (g/m2)) of the ink-receiving layer per unit area on the recording medium and a true density (D1 (ml/g)) of the ink-receiving layer in accordance with the equation, VP=V1/H1−D1. The true density of the ink-receiving layer can be measured by suitably taking the ink-receiving layer out of the recording medium and using, for example, a dry automatic densimeter (Accupyc 1330, manufactured by Shimadzu Corporation) or the like. In the case of a recording medium, in which a multi-layer receiving layer has been formed on a base material, the measurement is made as to the outermost layer to determine the respective values.

Examples of the polyvalent metal ion in the present invention include polyvalent ions of alkaline earth metals such as magnesium and calcium, rare earth metals such as yttrium, lanthanum and cerium, and transition metals such as zirconium. However, any polyvalent metal ion may be used so far as it can insolubilize the polymer in the liquid composition for forming the coating layer. At least one selected from these polyvalent metal ions may be used.

Methods for adding the polyvalent metal ion to the ink-receiving layer include a method, in which an aqueous solution of a water-soluble polyvalent metal salt is applied to a recording medium produced so as to give a desired polyvalent metal ion concentration, and a method, in which a polyvalent metal salt is added into a coating formulation for forming the ink-receiving layer in advance so as to give a desired polyvalent metal ion concentration, and such a coating formulation is applied to a base material and dried to form the ink-receiving layer.

As the recording medium used in the present invention, may be suitably used that obtained by providing a porous ink-receiving layer composed mainly of a pigment on a base material.

No particular limitation is imposed on the base material, and a paper web such as suitably sized paper, water leaf paper or resin-coated paper, a sheet-like substance such as a resin film, or cloth may be used. When suitably sized paper or water leaf paper is used as the base material in particular, such paper preferably has the same surface pH as that of the resulting recording medium from the viewpoint of stability. Further, taking the permeation of a gas from the back side thereof into consideration, that subjected to gas barrier treatment by lamination or the like may also be suitably used.

The ink-receiving layer of the recording medium in the present invention is preferably formed in such a manner that the pore volume thereof falls within a range of from 0.35 to 1.0 ml/g, more preferably from 0.4 to 0.9 ml/g. If the pore volume of the ink-receiving layer is greater than the upper limit of this range, cracking and dusting may occur on such an ink-receiving layer in some cases. If the pore volume of the ink-receiving layer is smaller than the lower limit of this range, the absorption of an ink is worsened. When multi-color printing is conducted in particular, inks may overflow the ink-receiving layer in some cases, so that the resulting image may become easy to cause bleeding.

The BET specific surface area of the ink-receiving layer is preferably within a range of from 50 to 300 $m^2/g$, more preferably from 100 to 300 $m^2/g$. If the BET specific surface area is smaller than the lower limit of this range, the gloss of such an ink-receiving layer is lost, and the haze thereof is increased, so that white mist may occur on the resulting image in some cases. If the BET specific surface area is greater than the upper limit of the range, such an ink-receiving layer may become easy to cause cracking. Incidentally, the BET specific surface area and pore volume can be determined by the nitrogen adsorption and desorption method after an ink-receiving layer is subjected to a degassing treatment.

No particular limitation is imposed on a material for forming the ink-receiving layer exhibiting the above-described physical properties. However, an alumina hydrate represented by the following general formula (2) may be mentioned as a preferable example from the viewpoints of coloring ability and absorbency.

$$Al_2O_3 \cdot n(OH)_{2n} \cdot mH_2O \qquad (2)$$

wherein n is an integer of 0, 1, 2 or 3, m is a number of 0 to 10, preferably 0 to 5. Incidentally, n and m are not 0 at the same time. In many cases, $mH_2O$ represents an aqueous phase, which does not participate in the formation of a crystal lattice, but is able to be eliminated. Therefore, m may take a value other than an integer. When this kind of alumina hydrate is calcined, m may reach a value of 0.

The pore physical properties of the alumina hydrate are adjusted in the course of the production thereof, and an alumina hydrate having a pore volume of 0.3 to 1.0 ml/g, preferably 0.35 to 0.9 ml/g is preferably used in order to satisfy the above-described BET specific surface area and pore volume of the ink-receiving layer. The alumina hydrate having a pore volume within this range is more preferred in that the pore volume of the resulting ink-receiving layer is controlled within the above-described range. With respect to the BET specific surface area, an alumina hydrate having a BET specific surface area of 50 to 350 $m^2/g$, preferably 100 to 250 $m^2/g$ is preferably used. The alumina hydrate having a BET specific surface area within this range is more preferred in that the BET specific surface area of the resulting ink-receiving layer is controlled within the above-described range.

The coating weight of a dispersion (coating formulation) may be 0.5 to 60 $g/m^2$, preferably 5 to 45 $g/m^2$ in terms of dry solids content. The layer thickness of the ink-receiving layer may be within a range of, for example, from 15 to 60 μm, preferably from 20 to 55 μm, particularly preferably from 25 to 50 μm for the purpose of achieving good ink absorbency and resolution.

(Recording Liquid)

The recording liquid containing a coloring material in the present invention will now be described. In the present invention, the component itself of the coloring material may be a publicly known material, and examples thereof include water-soluble dyes represented by direct dyes, acid dyes, basic dyes, reactive dyes and food colors. Such a water-soluble dye is used in a proportion of about 0.1 to 20% by mass in the recording liquid.

The solvent used for the recording liquid used in the present invention is water or a mixed solvent of water and a water-soluble organic solvent. Those mentioned for the liquid composition for forming the coating layer are preferably used. The content of the water-soluble organic solvent in the recording liquid is within a range of generally from 0 to 95% by mass, preferably from 10 to 80% by mass, more preferably from 15 to 50% by mass based on the whole mass of the ink (recording liquid).

In the recording liquid used in the present invention, a surfactant, a viscosity modifier, a surface tension modifier, a pH adjustor, a mildewproofing agent, a rust-preventing agent and/or the like may be added in addition to the above-described components, as needed.

<Ink-jet Recording Apparatus>

An apparatus having both image-forming section and liquid composition-applying section by an ink-jet system will now be described. An ink-jet recording apparatus according to an embodiment of the present invention comprises a first recording unit equipped with an ink container part, which contains an ink containing a coloring material, and an ink-jet head for ejecting the ink and a second recording unit equipped with a liquid composition container part, which contains a liquid composition, and an ink-jet head for ejecting the liquid composition. An ink-jet recording apparatus according to another embodiment comprises an ink container part, which contains an ink containing a coloring material, a liquid composition container part, which contains a liquid composition, and ink-jet heads for independently ejecting the ink contained in the ink container part and the liquid composition contained in the liquid composition container part. These apparatus will hereinafter be described.

FIG. 1 illustrates an exemplary ink-jet recording apparatus. In FIG. 1, reference numeral 61 designates a blade serving as a wiping member, one end of which is a stationary end held by a blade-holding member to form a cantilever. The blade 61 is arranged at a position adjacent to a region in which a recording head 65 operates. In this embodiment, the blade 61 is held in such a form that it protrudes into the course through which the recording head 65 is moved. Reference numeral 62 indicates a cap for a face of ejection openings of the recording head 65, which is provided at a home position adjacent to the blade 61, and is so constructed that it moves in a direction perpendicular to a direction in which the recording head 65 is moved, and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved. The above-described blade 61, cap 62 and ink-absorbing member 63 constitute an ejection-recovery portion 64, where the blade 61 and ink-absorbing member 63 remove water, dust and/or the like from the face of the ink-ejecting openings. Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto. Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the ejection-recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 3:
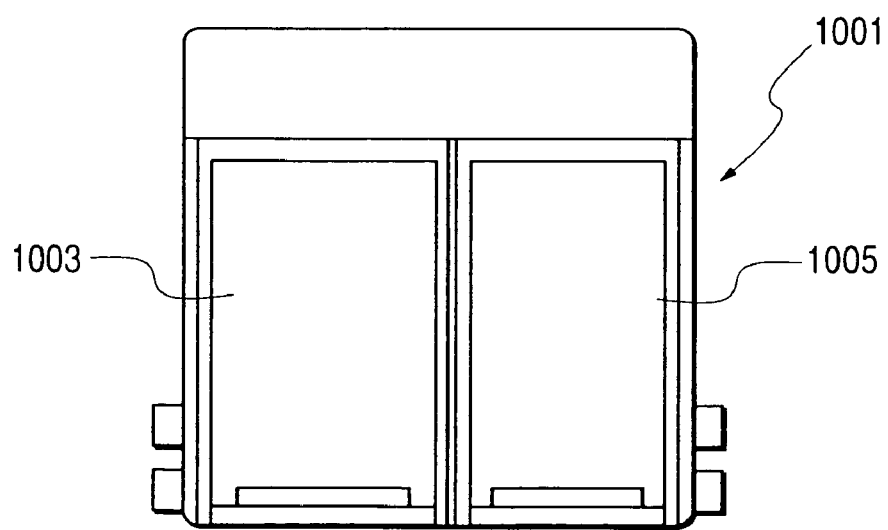
FIG. 3 schematically illustrates a cartridge equipped with container parts respectively containing an ink and a liquid composition according to the present invention.
Figure 4:
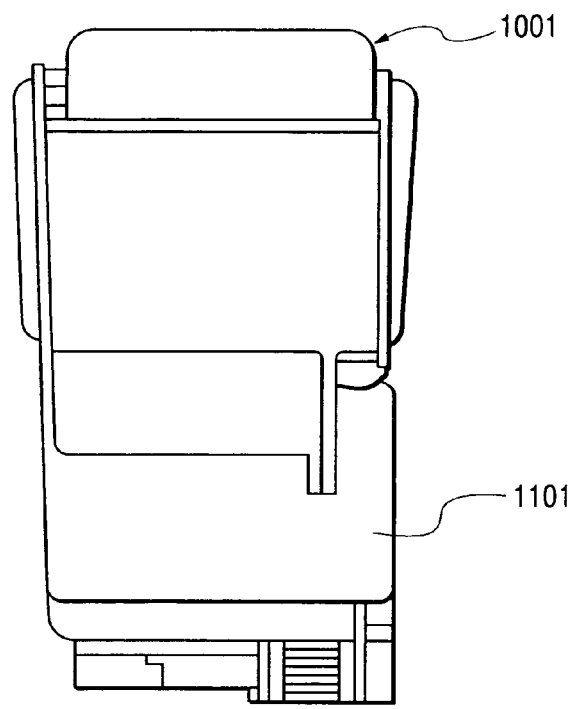
FIG. 4 schematically illustrates a recoding head in which the cartridge shown in FIG. 3 has been installed.

As an example of a cartridge according to the present invention, may be mentioned a cartridge so constructed that it has 2 container parts separately containing the ink and the liquid composition, which make up an ink set according to the present invention, is detachably installed in a recording head for ejecting the ink and the liquid composition and can fed the ink and the liquid composition to the recording head. FIG. 3 illustrates an example of such a cartridge 1001. Reference numerals 1003 and 1005 in FIG. 3 indicate an ink container part, which contains the ink, and a liquid composition container part, which contains the liquid composition, respectively. This cartridge is so constructed that it is detachably installed in a recording head 1101, from which the ink and the liquid composition can be ejected, as illustrated in FIG. 4, and that the liquid composition and the ink are fed to the recording head 1101 when the cartridge 1001 is installed in the recording head 1101.

The ink-jet recording apparatus used in the present invention are not limited to the apparatus as described above in which the head and the ink cartridge are separately provided as described above. Therefore, an apparatus in which these members are integrally formed can also be preferably used.

Incidentally, as the recording apparatus used in the present invention, may be used the ink-jet recording apparatus in which thermal energy is applied to the ink and the liquid composition to eject droplets of the ink and the liquid composition as described above, and an ink-jet recording apparatus of a piezo-system using a piezoelectric element.

Figure 2:
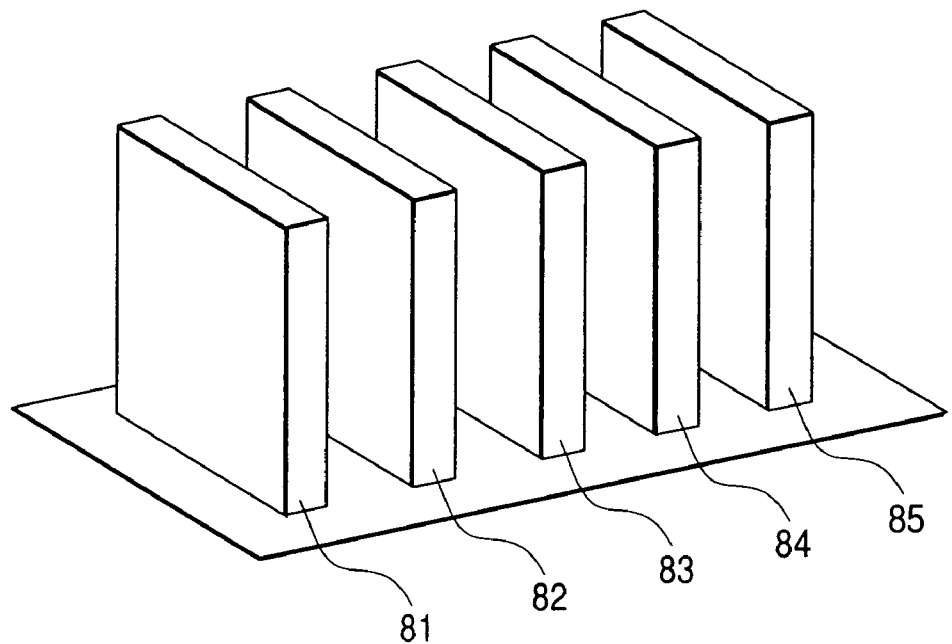
FIG. 2 schematically illustrates a recording unit containing a liquid composition according to the present invention and recording units respectively containing inks of Y, M, C and Bk have been mounted on the same carriage.
Figure 5:
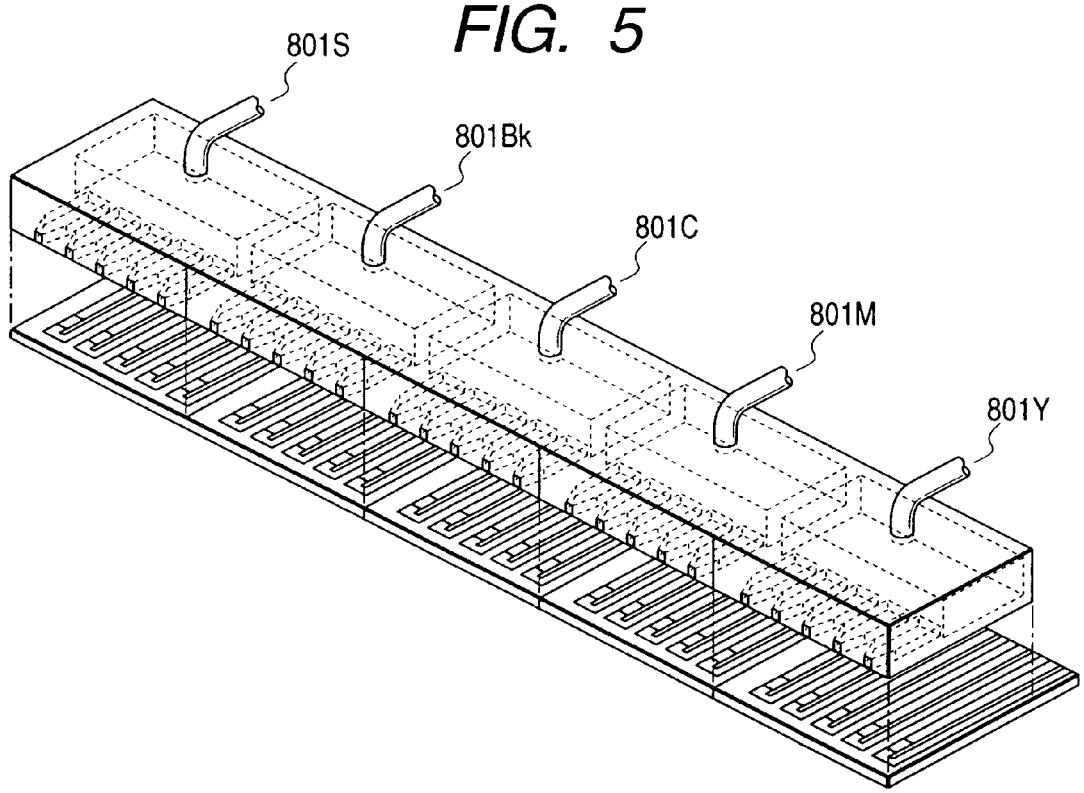
FIG. 5 illustrates, in enlarged scale, of an orifice part of a recording head according to an embodiment in the ink-jet recording apparatus shown in FIG. 1.

In the case where the process for forming a colored portion on the recording medium according to the present invention is carried out, for example, a recording apparatus, in which five recording heads are arranged on a carriage, is used. An example thereof is illustrated in FIG. 2. Reference numerals 81, 82, 83 and 84 indicate recording heads for ejecting yellow, magenta, cyan and black inks, respectively. Reference numeral 85 designates a head for ejecting the liquid composition according to the present invention. The heads are arranged in the above-described recording apparatus and serve to eject the respective recording inks of the different colors according to recording signals. The liquid composition according to the present invention is applied on to at least a part of an image formed after the ejection of the recording inks. FIG. 2 shows the case where the five recording heads are used. However, the present invention is not limited thereto. As shown in FIG. 5, preference is given even to the case where the flow paths of the inks of yellow 801Y, magenta 801M, cyan 801C and black 801Bk, and the liquid composition 801S are separately provided in one recording head.

<Roller-coating Device>

Figure 6:
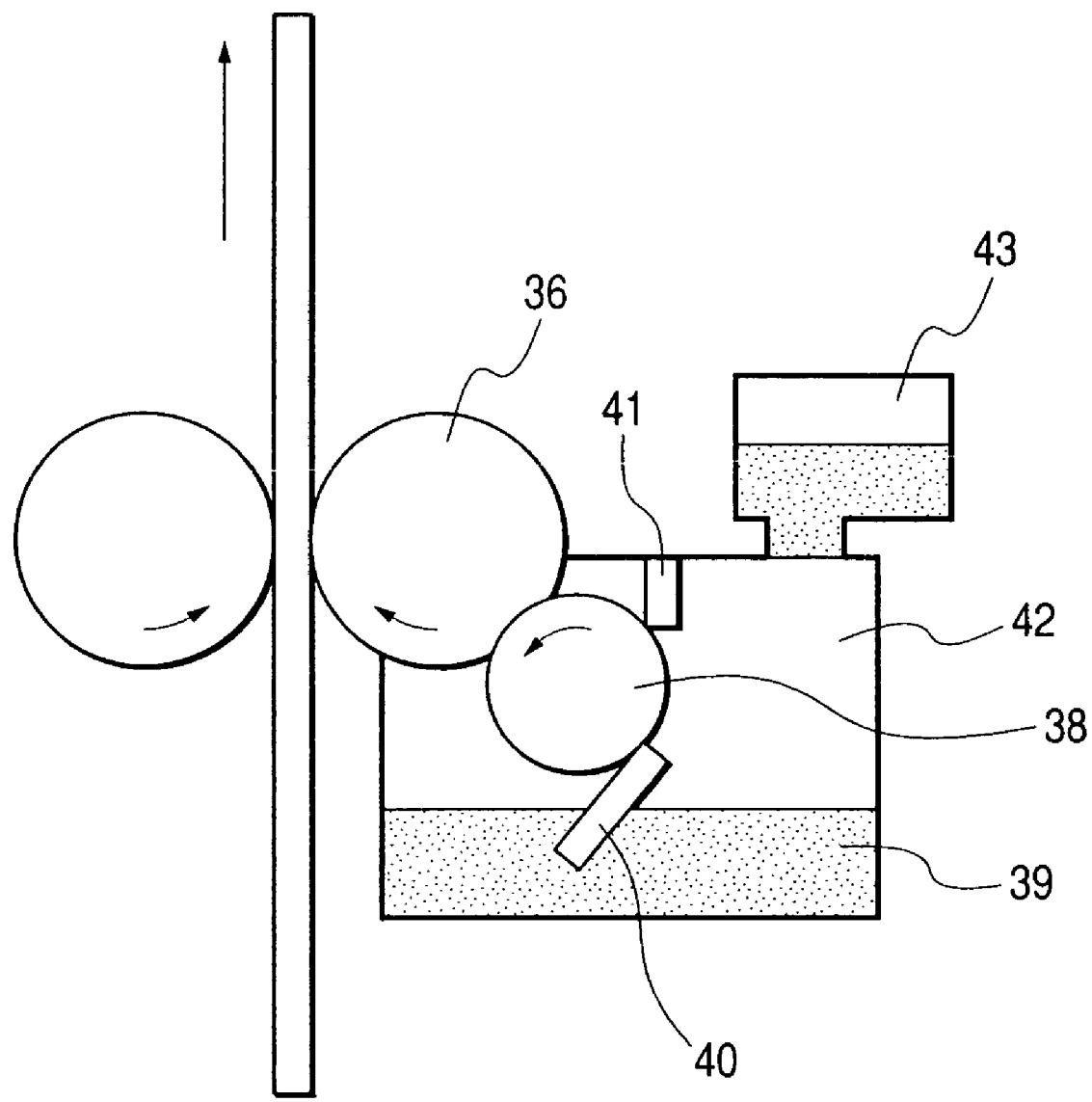
FIG. 6 typically illustrates a roller coater part of a roller-coating device of a liquid composition according to the present invention.

FIG. 6 typically illustrates a roller coater part of a roller-coating device. The liquid composition is charged into a tank 42, and the liquid composition is applied to an intermediate coating roller 38 by means of a coating member 40 composed of a porous material. The liquid composition is then applied to a surface of the recording medium, on which an image has been recorded, by means of a coating roller 36. Reference numeral 41 indicates a blade for uniformly applying the liquid composition to the coating roller. The liquid composition 39 is supplied from a liquid composition cartridge 43. The coating roller 36 may be formed of a rubber roller, fluororesin-coated roller, felt roller, brush roller or porous roller.

The present invention will hereinafter be described by the following Examples. Incidentally, all designations of "part" or "parts" and "%" as will be used in the following examples mean part or parts by mass and % by mass unless expressly noted.

EXAMPLES 1 TO 8

(Preparation 1 of Liquid Composition)

{Liquid Composition A}

A styrene-acrylic acid copolymer A (St (styrene)/AA (acrylic acid)=70/30 (% by weight); molecular weight: 10,000; acid value: 201) synthesized by a solution polymerization process using a radical initiator was used to prepare Liquid Composition A of the following composition. Incidentally, potassium hydroxide was used as a basic substance, and the amount added was controlled in such a manner that the pH of each liquid composition is 8.0.

| | |
|---|---|
| Styrene-acrylic acid copolymer A | 3 parts |
| Glycerol | 7 parts |
| Diethylene glycol | 5 parts |
| Water | 85 parts. |

{Liquid Composition B}

Liquid Composition B was prepared in the same manner as in Liquid Composition A except that the styrene-acrylic acid copolymer was changed as shown in Table 1.

(Production of Recording Medium)

{Recording Medium A}

Disperal HP13 (trade name; product of CONDEA Co.) as an alumina hydrate was mixed with purified water to prepare a dispersion containing 5% of solids. Hydrochloric acid was then added to the dispersion to adjust the pH of the dispersion to 4. After stirring the dispersion for a while, the dispersion was heated to 95° C. with stirring and kept for 2 hours at the same temperature. The pH of the dispersion was adjusted to 9.5 with caustic soda, and the dispersion was then kept for 8 hours with stirring. After 8 hours, the temperature of the dispersion was cooled down to room temperature, and the pH thereof was adjusted to 7.2. Thereafter, a desalting treatment was conducted, and acetic acid was added to conduct a deflocculating treatment, thereby obtaining colloidal sol. Alumina hydrate obtained by drying the colloidal sol of this alumina hydrate was determined by X-ray diffractometry and found to have a pseudoboehmite structure. At this time, the BET specific surface area was 150.2 m$^2$/g, and the pore volume was 0.68 ml/g. Incidentally, the specific surface area and pore volume were determined by the following respective methods.

1) Pore volume (PV): determined by means of "AUTOSORB I" (trade name, manufactured by Quantachrome Co.) in accordance with the nitrogen adsorption and desorption method after the sample was subjected to a degassing treatment at 120° C. for 24 hours.
2) BET specific surface area (SA): calculated out in accordance with the method of Brunauer, et al.

Polyvinyl alcohol PVA117 (trade name, product of Kuraray Co., Ltd.) was dissolved in purified water to obtain a 9% solution. Colloidal sol of the alumina hydrate obtained above was concentrated to obtain a 17% solution. The colloidal sol of the alumina hydrate and the polyvinyl alcohol solution were mixed with each other so as to give a weight ratio of 10:1 in terms of solids and stirred to obtain a dispersion.

After a 5% aqueous solution of sodium borate was applied on to a baryta layer of a base material (surface pH: 6.4) having the baryta layer in advance by an air knife coater so as to give a coating weight of 10 g/m$^2$, the above-prepared dispersion was further applied by a die coater so as to give a dry coating weight of 30 g/m$^2$. The base material used at this time was obtained by applying a baryta composition composed of 100 parts of barium sulfate and 10 parts of gelatin on to a fibrous base having a basis weight of 150 g/m$^2$ and a Stöckigt sizing degree of 200 seconds so as to give a dry coating weight of 30 g/m$^2$ and calendaring it.

The surface of the ink-receiving layer provided on the base material having the baryta layer was subjected to a rewet casting treatment with hot water (80° C.) by means of a rewet cast coater to obtain a glossy recording medium. Polyethylene was additionally laminated by an extrusion laminator so as to give a coating weight of 20 g/m$^2$. The surface pH of the recording medium was 7.2.

{Recording Media A to D}

An aqueous solution of nitric acid was applied on to the recording medium obtained in the above-described manner by a wire bar and dried to obtain Recording Media A to D whose surface pH was adjusted as shown in Table 1.

EXAMPLES 1 TO 5

The liquid compositions and the recording media were combined as shown in Table 1 to make the following evaluation. In each recorded article obtained, it was confirmed by observation of its section through a scanning electron microscope that a thin film having its corresponding thickness shown in Table 1 is formed. The results are shown in Table 1.

EXAMPLES 6 TO 8

When the content of the styrene-acrylic acid copolymer in Liquid Composition A used in EXAMPLE 1 was changed to 8 parts (Liquid Composition D, EXAMPLE 6), 0.5 parts (Liquid Composition E, EXAMPLE 7) and 0.2 parts (Liquid Composition F, EXAMPLE 8), respectively, the thickness of the thin film layer was changed to 920 nm, 50 nm and 20 nm, respectively.

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (90% and 100%) and secondary color printing (200%) with color inks of the following respective compositions.

Ink Composition:

| | |
|---|---|
| Dye (Y, M C or Bk) | 5 parts |
| Ethylene glycol | 10 parts |
| Polyethylene glycol | 10 parts |
| Water | 75 parts. |

Dyes for Inks:
  Y: C.I. Acid Yellow 23
  M: C.I. Acid Red 52
  C: C.I. Direct Blue 199
  Bk: C.I. Food Black 2.

(Formation of Coating Layer; Ink-jet Process)

After printing with the recording liquids respectively containing the above-described coloring materials, solid printing (200%) with the liquid composition was conducted in the same manner as described above so as to completely cover the sites at which solid printing had been conducted with the respective color inks.

(Formation of Coating Layer; Coating Process)

After printing with the recording liquids respectively containing the above-described coloring materials, the liquid composition was applied in an amount of 20 g/m$^2$ by a roll coater so as to completely cover the sites at which solid printing had been conducted with the respective color inks.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of the rate (%) of change of the image density after the ozone exposure test.

Gas resistance (%)=(Image density after the ozone exposure test/Image density before the ozone exposure test)×100(%)

(Tint)

The tint of the monochromatic solid print portions (90% and 100%) of cyan prepared above was visually evaluated in accordance with the following standard.
- A: The tint was not changed at the 100% cyan solid print portion;
- B: The tint was not changed at the 90% cyan solid print portion;
- C: The tint was somewhat reddish at the 90% cyan solid print portion.

| Water | 84 parts |
| BC-30TX (Polyoxyethylene cetyl ether (EO 30), product of Nippon Surfactant Kogyo K.K.) | 1 part. |

{Liquid Composition 1D}

Liquid Composition 1D was prepared in the same manner as in Liquid Composition 1A except that a benzyl acrylate-acrylic acid copolymer 1D (BzA/AA=90/10 (% by weight); molecular weight: 11,000; actual acid value: 70) synthesized by a solution polymerization process using a radical initiator was used in place of the styrene-acrylic acid copolymer 1A.

{Liquid Composition 1E}

Liquid Composition 1E was prepared in the same manner as in Liquid Composition 1A except that an n-butyl methacrylate-acrylic acid copolymer 1E (nBMA/AA=80/20 (% by weight); molecular weight: 10,500; actual acid value: 130) synthesized by a solution polymerization process using a radical initiator was used in place of the styrene-acrylic acid copolymer 1A.

TABLE 1

|  | EXAMPLE 1 | EXAMPLE 2 | EXAMPLE 3 | EXAMPLE 4 |
|---|---|---|---|---|
| Liquid composition | Liquid composition A | Liquid composition A | Liquid composition A | Liquid composition B |
| St/AA | 70/30 | 70/30 | 70/30 | 55/45 |
| Molecular weight | 10,000 | 10,000 | 10,000 | 12,000 |
| Recording medium | Recording Medium B | Recording Medium A | Recording Medium C | Recording Medium D |
| Surface pH | 6.0 | 7.0 | 5.4 | 5.0 |
| Process for forming coating layer | Ink-jet | Ink-jet | Ink-jet | Ink-jet |
| Thickness of coating layer (nm) | 330 | 290 | 410 | 500 |
| Gas resistance (%) | 98 | 98 | 98 | 98 |
| Tint | A | A | A | B |
|  | EXAMPLE 5 | EXAMPLE 6 | EXAMPLE 7 | EXAMPLE 8 |
| Liquid composition | Liquid composition A | Liquid composition D | Liquid composition E | Liquid composition F |
| St/AA | 70/30 | 70/30 | 70/30 | 70/30 |
| Molecular weight | 10,000 | 10,000 | 10,000 | 10,000 |
| Recording medium | Recording Medium B | Recording Medium B | Recording Medium B | Recording Medium B |
| Surface pH | 6.0 | 6.0 | 6.0 | 6.0 |
| Process for forming coating layer | Roll coating | Ink-jet | Ink-jet | Ink-jet |
| Thickness of coating layer (nm) | 320 | 920 | 50 | 20 |
| Gas resistance (%) | 98 | 99 | 90 | 70 |
| Tint | A | A | A | A |

EXAMPLES 9 TO 13

(Preparation of Liquid Composition)

{Liquid Composition 1A}

A styrene-acrylic acid copolymer 1A (St/AA=80/20 (% by weight); molecular weight: 10,000; actual acid value: 132) synthesized by a solution polymerization process using a radical initiator was used to prepare Liquid Composition 1A of the following composition. Incidentally, potassium hydroxide was used as a basic substance, and the amount added was controlled in such a manner that the pH of each liquid composition is 8.0.

| Styrene-acrylic acid copolymer 1A | 3 parts |
| Glycerol | 7 parts |
| Diethylene glycol | 5 parts |

{Liquid Composition F}

The n-butyl methacrylate-acrylic acid copolymer 1E was used to prepare Liquid Composition 1F of the following composition. Incidentally, potassium hydroxide was used as a basic substance, and the amount added was controlled in such a manner that the pH of each liquid composition is 8.0.

| n-Butyl methacrylate-acrylic acid copolymer 1E | 3 parts |
| Glycerol | 7 parts |
| Diethylene glycol | 5 parts |
| Water | 84.95 parts |
| BC-30TX (Polyoxyethylene cetyl ether (EO 30), product of Nippon Surfactant Kogyo K.K.) | 0.05 parts. |

{Liquid Composition 1G}

The n-butyl methacrylate-acrylic acid copolymer 1E was used to prepare Liquid Composition 1G of the following composition. Incidentally, potassium hydroxide was used as a basic substance, and the amount added was controlled in such a manner that the pH of each liquid composition is 8.0.

| | |
|---|---|
| n-Butyl methacrylate-acrylic acid copolymer 1E | 3 parts |
| Glycerol | 7 parts |
| Diethylene glycol | 5 parts |
| Water | 84 parts |
| BC-5 (Polyoxyethylene cetyl ether (EO 5), product of Nippon Surfactant Kogyo K.K.) | 1 part. |

(Recording Medium)

The Recording Medium B used in EXAMPLE 1 was used.

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (100%) with color inks of the following respective compositions, and solid printing (200%) was then conducted with the liquid composition so as to completely cover the sites at which solid printing had been conducted with the respective color inks.

Ink Composition:

| | |
|---|---|
| Dye (Y, M C or Bk) | 4 parts |
| Ethylene glycol | 5 parts |
| Glycerol | 10 parts |
| Ethyleneurea | 5 parts |
| Water | 76 parts. |

Dyes for Inks:
  Y: C.I. Direct Yellow 86
  M: C.I. Acid Red 52
  C: C.I. Direct Blue 199
  Bk: C.I. Food Black 2.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of the rate (%) of change of the image density after the ozone exposure test.

Gas resistance (%)=(Image density after the ozone exposure test/Image density before the ozone exposure test)×100 (%)

(Ejection Stability)

An ink-jet recording head evaluation apparatus CANVAS (trade name, manufactured by Canon Inc.) and a printing head for Canon Printer BJF-660 were used to judge the scatter of ejection velocity between the respective inks under the same conditions as head driving conditions for printing by the printer.

A: At most 1 m/s;
B: 1 to 2 m/s;
C: 2 to 4 m/s;
D: At least 4 m/s.

The above evaluation was made by combining the liquid composition and the recording medium as shown in Table 2.

TABLE 2

| | EXAMPLE 9 | EXAMPLE 10 | EXAMPLE 11 | EXAMPLE 12 | EXAMPLE 13 |
|---|---|---|---|---|---|
| Liquid composition | Liquid Composition 1A | Liquid Composition 1D | Liquid Composition 1E | Liquid Composition 1F | Liquid Composition 1G |
| Recording medium | Recording Medium B | Recording Medium B | Recording Medium B | Recording Medium B | Recording Medium B |
| Gas resistance (%) | 98 | 99 | 85 | 80 | 80 |
| Ejection stability | A | A | A | B | B |

EXAMPLES 14 TO 19

(Preparation of Liquid Composition)

{Liquid Composition 2A}

An n-butyl acrylate-acrylic acid copolymer (nBA/AA=85/15 (% by weight); molecular weight: 10,000) and a styrene-acrylic acid copolymer (St/AA=70/30 (% by weight); molecular weight: 10,000) synthesized by a solution polymerization process using a radical initiator were used to prepare Liquid Composition 2A of the following composition. Incidentally, potassium hydroxide was used as a basic substance, and the amount added was controlled in such a manner that the pH of each liquid composition is 8.0.

| | |
|---|---|
| n-Butyl acrylate-acrylic acid copolymer | 1.5 parts |
| Styrene-acrylic acid copolymer | 1.5 parts |
| Glycerol | 7 parts |
| Diethylene glycol | 5 parts |
| Water | 85 parts. |

{Liquid Compositions 2D and 2E}

Liquid Compositions 2D and 2E were prepared in the same manner as in Liquid Composition 2A except that the amount of the n-butyl acrylate-acrylic acid copolymer was changed as shown in Table 3.

(Recording Medium)

Recording Media A to C respectively used in EXAMPLES 1 to 3 were used.

EXAMPLES 14 TO 16

The liquid compositions and the recording media were combined as shown in Table 4 to make the following evaluation. In each recorded article obtained, it was confirmed by observation of its section through a scanning electron microscope that a coating layer on the surface and an impregnated layer into the surface layer, which have their corresponding thicknesses shown in Table 4, are formed. The results are shown in Table 4.

EXAMPLES 17 TO 18

The content of the n-butyl acrylate-acrylic acid copolymer in Liquid Composition 2A used in EXAMPLE 14 was changed to 8 parts (Liquid Composition 2D, EXAMPLE 17) and 0.5 parts (Liquid Composition 2E, EXAMPLE 18), respectively, to make the following evaluation in combination with the respective recording media shown in Table 4. The results are shown in Table 4.

Liquid Composition 2F

Liquid Composition 2F was prepared in the same manner as in Liquid Composition 2A except that the n-butyl acrylate-acrylic acid copolymer in Liquid Composition 2A used in EXAMPLE 14 was changed to a 2-ethylhexyl acrylate-acrylic acid copolymer (2EHA/AA=85/15 (% by weight); molecular weight: 10,000).

EXAMPLE 19

The liquid composition and the recording medium were combined as shown in Table 4 to make the following evaluation. The results are shown in Table 4.

EXAMPLE 20

After printing on Recording Medium B, Liquid Composition 2A was applied by a wire bar. At this time, it was confirmed that a coating layer having a thickness of 0.9 μm and an impregnated layer having a thickness of 1.1 μm are formed on the surface and in the interior of the surface layer, respectively. This recorded article was evaluated by the following respective evaluation methods. As a result, the gas resistance was 98%, and the rub-off resistance, tint, resistance to bleeding and stickiness on the surface of the image were all good (A).

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (90% and 100%) and secondary color printing (200%) with color inks of the following respective compositions, and solid printing (200%) with the liquid composition was then conducted in the same manner as described above so as to completely cover the sites at which solid printing had been conducted with the respective color inks.

Ink Composition:

| | |
|---|---|
| Dye (Y, M C or Bk) | 5 parts |
| Ethylene glycol | 10 parts |
| Polyethylene glycol | 10 parts |
| Water | 75 parts. |

Dyes for inks:
 Y: C.I. Acid Yellow 23
 M: C.I. Acid Red 52
 C: C.I. Direct Blue 199
 Bk: C.I. Food Black 2.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of the rate (%) of change of the image density after the ozone exposure test.

Gas resistance (%)=(Image density after the ozone exposure test/Image density before the ozone exposure test)×100(%)

(Rub-off Resistance)

After the monochromatic solid print portion (100%) of black prepared above was rubbed 5 times with silbon paper under a load of 40 g/cm$^2$, the above-described test as to the gas resistance was conducted to visually evaluate it as to the rub-off resistance in accordance with the following standard.
 A: No scratch-like discoloration occurred at the rubbed portion;
 B: Scratch-like discoloration was slightly observed at the rubbed portion, but it was not observed when viewed 30 cm away;
 C: Scratch-like discoloration was observed at the rubbed portion even when viewed 30 cm away.

(Tint)

The tint of the monochromatic solid print portions (90% and 100%) of cyan prepared above was visually evaluated in accordance with the following standard.
 A: The tint was not changed at the 100% cyan solid print portion;
 B: The tint was not changed at the 90% cyan solid print portion;
 C: The tint was somewhat reddish at the 90% cyan solid print portion.

TABLE 3

| | | Polymer 1 | | | Polymer 2 | |
|---|---|---|---|---|---|---|
| | Composition | Molecular weight | Amount added (parts) | Composition | Molecular weight | Amount added |
| Liquid Composition 2A | nBA/AA = 85/15 | 10,000 | 1.5 | St/AA = 70/30 | 10,000 | 1.5 |

TABLE 3-continued

|  | Polymer 1 | | | Polymer 2 | | |
| --- | --- | --- | --- | --- | --- | --- |
|  | Composition | Molecular weight | Amount added (parts) | Composition | Molecular weight | Amount added |
| Liquid Composition 2D | nBA/AA = 85/15 | 10,000 | 8 | St/AA = 70/30 | 10,000 | 1.5 |
| Liquid Composition 2E | nBA/AA = 85/15 | 10,000 | 0.5 | St/AA = 70/30 | 10,000 | 1.5 |
| Liquid Composition 2F | 2EHA/AA = 85/15 | 9,000 | 1.5 | St/AA = 70/30 | 10,000 | 1.5 |

NBA: n-butyl acrylate
2EHA: 2-ethylhexyl acrylate
St: styrene
AA: acrylic acid.

TABLE 4

|  | Ex. 14 | Ex. 15 | Ex. 16 | Ex. 17 | Ex. 18 | Ex. 19 |
| --- | --- | --- | --- | --- | --- | --- |
| Liquid composition | 2A | 2A | 2A | 2D | 2E | 2F |
| Recording medium | B | A | C | B | B | B |
| Surface pH | 6 | 7 | 5.4 | 6 | 6 | 6 |
| Thickness of coating layer on recording medium surface (μm) | 0.3 | 0.12 | 0.4 | 0.3 | 0.3 | 0.3 |
| Thickness of impregnated layer formed within surface layer on recording medium surface (μm) | 1 | 1.3 | 0.8 | 1.4 | 0.2 | 0.4 |
| Gas resistance | 98 | 98 | 98 | 99 | 95 | 94 |
| Rub-off resistance | A | A | A | A | B | A |
| Tint | A | A | A | A | A | A |

EXAMPLES 21 TO 26 AND COMPARATIVE EXAMPLES 1 TO 3

<Recording Medium>

Recording Medium B used in EXAMPLE 1 was used.

<Preparation Example of Water-soluble High-molecular Copolymer Related to Liquid Composition>

PREPARATION EXAMPLE 3-1

A reactor equipped with a stirrer and a reflux condenser was charged with 150 g of propylene glycol monomethyl ether. (hereinafter abbreviated as "PGM") that is a polymerization solvent, and the contents were heated to the reflux temperature while introducing nitrogen gas and stirring them. A dropping funnel charged with 70.0 g of benzyl methacrylate and 30.0 g of methacrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a colorless and transparent solution. The actual acid value and weight average molecular weight of the polymer were 172 and 9,700, respectively.

PREPARATION EXAMPLE 3-2

A reactor equipped with a stirrer and a reflux condenser was charged with 150 g of PGM that is a polymerization solvent, and the contents were heated to the reflux temperature while introducing nitrogen gas and stirring them. A dropping funnel charged with 80.0 g of cyclohexyl acrylate and 20.0 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 23.1 g of 48% caustic soda and 200 g of ion-exchanged water were added to conduct neutralization. The thus-obtained aqueous polymer solution was a colorless and transparent solution. The actual acid value and weight average molecular weight of the polymer were 126 and 7,100, respectively.

PREPARATION EXAMPLE 3-3

A reactor equipped with a stirrer and a reflux condenser was charged with 150 g of PGM that is a polymerization solvent, and the contents were heated to the reflux temperature while introducing nitrogen gas and stirring them. A dropping funnel charged with 68.0 g of styrene and 32.0 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 18.5 g of 48% caustic soda and 200 g of ion-exchanged water were added to conduct neutralization. The thus-obtained aqueous polymer solution was a pale yellow and transparent solution. The actual acid value and weight average molecular weight of the polymer were 205 and 7,900, respectively.

PREPARATION EXAMPLE 3-4

A reactor equipped with a stirrer and a reflux condenser was charged with 150 g of PGM that is a polymerization solvent, and the contents were heated to the reflux temperature while introducing nitrogen gas and stirring them. A dropping funnel charged with 84.0 g of butyl methacrylate and 16.0 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 37.0 g of 48% caustic soda and 200 g of ion-exchanged water were added to conduct neutralization. The thus-obtained aqueous polymer solution was a pale yellow and transparent solution. The actual acid value and weight average molecular weight of the polymer were 115 and 9,500, respectively.

PREPARATION EXAMPLE 3-5

A reactor equipped with a stirrer and a reflux condenser was charged with 150 g of PGM that is a polymerization solvent, and the contents were heated to the reflux temperature while introducing nitrogen gas and stirring them. A dropping funnel charged with 65 g of styrene, 15 g of n-butyl acrylate and 20 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 23.1 g of 48% caustic soda and 200 g of ion-exchanged water were added to conduct neutralization. The thus-obtained aqueous polymer solution was a pale yellow and transparent solution. The actual acid value and weight average molecular weight of the polymer were 145 and 10,500, respectively.

PREPARATION EXAMPLE 3-6

A reactor equipped with a stirrer and a reflux condenser was charged with 150 g of PGM that is a polymerization solvent, and the contents were heated to the reflux temperature while introducing nitrogen gas and stirring them. A dropping funnel charged with 85 g of n-butyl acrylate and 15 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 17.3 g of 48% caustic soda and 200 g of ion-exchanged water were added to conduct neutralization. The thus-obtained aqueous polymer solution was a pale yellow and transparent solution. The actual acid value and weight average molecular weight of the polymer were 108 and 10,200, respectively.

<Preparation of Liquid Composition for Ink-jet Recording>

Liquid Composition 31:
The preparation of a liquid composition was conducted in the following manner. Namely, the water-soluble high-molecular copolymer obtained in Preparation Example 3-1 was mixed with glycerol, diethylene glycol, trimethylolpropane and ion-exchanged water at a mass ratio described below, and the resultant mixture was stirred for 30 minutes. Thereafter, the mixture was filtered through a membrane filter having a pore size of 0.2 µm to prepare Liquid Composition 31.
  Glycerol: 7%
  Diethylene glycol: 5%
  Trimethylolpropane: 7%
  Water-soluble high-molecular copolymer obtained in Preparation Example 3-1: 3% (in terms of solids concentration of the polymer)
  Ion-exchanged water: 78%.

The following Liquid Compositions 32 to 35 were prepared in accordance with the preparation process of Liquid Composition 31.

Liquid Composition 32:
  Glycerol: 7%
  Diethylene glycol: 5%
  Trimethylolpropane: 7%
  Water-soluble high-molecular copolymer obtained in Preparation Example 3-2: 3% (in terms of solids concentration of the polymer)
  Ion-exchanged water: 78%.

Liquid Composition 33:
  Glycerol: 7%
  Diethylene glycol: 5%
  Trimethylolpropane: 7%
  Water-soluble high-molecular copolymer obtained in Preparation Example 3-3: 3% (in terms of solids concentration of the polymer)
  Ion-exchanged water: 78%.

Liquid Composition 34:
  Glycerol: 7%
  Diethylene glycol: 5%
  Trimethylolpropane: 7%
  Water-soluble high-molecular copolymer obtained in Preparation Example 3-4: 3% (in terms of solids concentration of the polymer)
  Ion-exchanged water: 78%.

Liquid Composition 35:
  Glycerol: 7%
  Diethylene glycol: 5%
  Trimethylolpropane: 7%

Water-soluble high-molecular copolymer obtained in Preparation Example 3-5: 3% (in terms of solids concentration of the polymer)

Ion-exchanged water: 78%.

Liquid Composition 36:
Glycerol: 7%
Diethylene glycol: 5%
Trimethylolpropane: 7%
Water-soluble high-molecular copolymer obtained in Preparation Example 3-6: 3% (in terms of solids concentration of the polymer)
Ion-exchanged water: 78%.

Liquid Composition 37 was prepared by using POVAL having a polymerization degree of 100 in accordance with the following composition.

Liquid Composition 37:
Glycerol: 7%
Diethylene glycol: 5%
Trimethylolpropane: 7%
POVAL: 3% (in terms of solids concentration of the polymer)
Ion-exchanged water: 78%.

EXAMPLES 21 TO 26 AND COMPARATIVE EXAMPLE 1

Liquid Compositions 31 to 37 were evaluated according to the following method. The results are shown in Table 5.

COMPARATIVE EXAMPLE 2

Recording Medium B was used as a blank as it is (without applying any liquid composition).

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (100%) and secondary color printing (200%) with color inks of the following respective compositions, and solid printing (200%) was then conducted with the liquid composition so as to completely cover the sites at which solid printing had been conducted with the respective color inks. Further, solid printing (200%) with the liquid composition was also conducted on a non-printed portion.

Ink Composition:

| Dye (Y, M C or Bk) | 4 parts |
| Ethylene glycol | 5 parts |
| Glycerol | 10 parts |
| Ethyleneurea | 5 parts |
| Water | 76 parts. |

Dyes for Inks:
Y: C.I. Direct Yellow 86
M: C.I. Acid Red 52
C: C.I. Direct Blue 199
Bk: C.I. Food Black 2.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

TABLE 5

| Example | Liquid composition | Gas resistance |
|---|---|---|
| EXAMPLE 21 | Liquid Composition 31 | 99 |
| EXAMPLE 22 | Liquid Composition 32 | 99 |
| EXAMPLE 23 | Liquid Composition 33 | 98 |
| EXAMPLE 24 | Liquid Composition 34 | 72 |
| EXAMPLE 25 | Liquid Composition 35 | 95 |
| EXAMPLE 26 | Liquid Composition 36 | 70 |
| COMP. EXAMPLE 1 | Liquid Composition 37 | 31 |
| COMP. EXAMPLE 2 | Blank | 19 |

EXAMPLE 27 AND COMPARATIVE EXAMPLE 3

Liquid compositions containing the high-molecular copolymer obtained in Preparation Example 3-1 in amounts of 1.0 part, 3.0 parts and 6.0 parts respectively were prepared in accordance with the following respective compositions (EXAMPLE 27).

The liquid composition containing the high-molecular copolymer obtained in Preparation Example 3-1 in an amount of 1.0 part was prepared in accordance with the following composition.

Glycerol: 7%
Diethylene glycol: 5%
Trimethylolpropane: 7%
Water-soluble high-molecular copolymer obtained in Preparation Example 3-1:1% (in terms of solids concentration of the polymer)
Ion-exchanged water: 80%.

The liquid composition containing the high-molecular copolymer obtained in Preparation Example 3-1 in an amount of 6.0 parts was prepared in accordance with the following composition.

Glycerol: 7%
Diethylene glycol: 5%
Trimethylolpropane: 7%
Water-soluble high-molecular copolymer obtained in Preparation Example 3-1: 6% (in terms of solids concentration of the polymer)
Ion-exchanged water: 75%.

Liquid compositions (COMPARATIVE EXAMPLE 3) containing poval (polymerization degree: 100) were prepared in the same manner as in EXAMPLE 27. The liquid compositions and the recording medium were combined to conduct the above-described evaluation. The results are shown in Table 6.

TABLE 6

|  | High-molecular copolymer | Concentration of high-molecular copolymer (parts) | Gas resistance |
|---|---|---|---|
| EXAMPLE 27 | High-molecular copolymer obtained in Preparation Example 3-1 | 1.0<br>3.0<br>6.0 | 98<br>99<br>99 |
| COMPARATIVE EXAMPLE 3 | POVAL (polymerization degree: 100) | 1.0<br>3.0<br>6.0 | 28<br>31<br>32 |

EXAMPLES 28 TO 31 AND COMPARATIVE EXAMPLE 4

<Recording Medium>

Recording Medium B used in EXAMPLE 1 was used.

<Preparation Example of Water-soluble High-molecular Copolymer Related to Liquid Composition>

PREPARATION EXAMPLE 4-1

A reactor equipped with a stirrer and a reflux condenser was charged with 150 g of PGM that is a polymerization solvent, and the contents were heated to the reflux temperature while introducing nitrogen gas and stirring them. A dropping funnel charged with 69.0 g of styrene, 30.0 g of methacrylic acid and 1.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a colorless and transparent solution.

PREPARATION EXAMPLE 4-2

A reactor equipped with a stirrer and a reflux condenser was charged with 150 g of PGM that is a polymerization solvent, and the contents were heated to the reflux temperature while introducing nitrogen gas and stirring them. A dropping funnel charged with 65.0 g of styrene, 30.0 g of methacrylic acid and 5.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a colorless and transparent solution.

PREPARATION EXAMPLE 4-3

A reactor equipped with a stirrer and a reflux condenser was charged with 150 g of PGM that is a polymerization solvent, and the contents were heated to the reflux temperature while introducing nitrogen gas and stirring them. A dropping funnel charged with 60.0 g of styrene, 30.0 g of methacrylic acid and 10.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a pale yellow and transparent solution.

PREPARATION EXAMPLE 4-4

A reactor equipped with a stirrer and a reflux condenser was charged with 150 g of PGM that is a polymerization solvent, and the contents were heated to the reflux temperature while introducing nitrogen gas and stirring them. A dropping funnel charged with 50.0 g of styrene, 30.0 g of methacrylic acid and 20.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a pale yellow and transparent solution.

EXAMPLE 28

<Preparation of Liquid Composition>

The preparation of a liquid composition was conducted in the following manner. Namely, the water-soluble high-molecular copolymer obtained in Preparation Example 4-1 was mixed with glycerol, diethylene glycol, trimethylolpropane and ion-exchanged water at a mass ratio described below, and the resultant mixture was stirred for 30 minutes. Thereafter, the mixture was filtered through a membrane filter having a pore size of 0.2 μm to prepare Liquid Composition 41.

An ink-jet printer (BJF870, trade name, manufactured by Canon Inc.) was used to conduct momochromatic printing (100%) on Recording Medium B prepared above with color inks of the following respective compositions, and solid printing (200%) with the liquid composition was then conducted so as to completely cover the sites at which solid printing had been conducted with the respective color inks. The thus-obtained recorded article was evaluated as to gas resistance and light fastness. Further, UV absorption spectrophotometry was also conducted.

Liquid Composition 41:
  Glycerol: 7%
  Diethylene glycol: 5%
  Trimethylolpropane: 7%
  Water-soluble high-molecular copolymer obtained in Preparation Example 4-1: 4% (in terms of solids concentration of the polymer)
  Ion-exchanged water: 77%.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100(%)

<Light Fastness>

The monochromatic solid print portion (100%) of magenta prepared above was subjected to an exposure test as to light fastness by means of a fluorescent lamp light fastness tester under the following conditions. The light fastness was evaluated in terms of a rate (%) of change of the image density after the light fastness test.

Light fastness (%)=(Image density after the fluorescent lamp test/Image density before the fluorescent lamp test)×100(%)

Test Conditions:
  Light quantity irradiated: 70 klx
  Test time: 620 hours
  Temperature and humidity within test chamber: 24° C., 60% RH
  Filter: soda lime.

<UV Absorption Spectrophotometry>

Liquid Composition 41 prepared above was applied on to a PET film to form a thin film, and a UV absorption spectrum (U-3300, manufactured by Hitachi Ltd.) was measured by using the PET film as a blank. As a result, the maximum absorption wavelength was 338.5 nm, and the absorbance was 0.15. Further, as a result of observation through SEM, the film thickness was found to be 0.48 μm, so that the absorptivity coefficient "e" calculated out therefrom was 0.31.

EXAMPLES 29 TO 31

The following liquid compositions were prepared in accordance with the preparation process of Liquid Composition 41.

Liquid Composition 42:
  Glycerol: 7%
  Diethylene glycol: 5%
  Trimethylolpropane: 7%
  Water-soluble high-molecular copolymer obtained in Preparation Example 4-2: 4% (in terms of solids concentration of the polymer)
  Ion-exchanged water: 77%.

Liquid Composition 43:
  Glycerol: 7%
  Diethylene glycol: 5%
  Trimethylolpropane: 7%
  Water-soluble high-molecular copolymer obtained in Preparation Example 4-3: 4% (in terms of solids concentration of the polymer)
  Ion-exchanged water: 77%.

Liquid Composition 44:
  Glycerol: 7%
  Diethylene glycol: 5%
  Trimethylolpropane: 7%
  Water-soluble high-molecular copolymer obtained in Preparation Example 4-4: 4% (in terms of solids concentration of the polymer)
  Ion-exchanged water: 77%.

Liquid Compositions 42 to 44 were also evaluated in the same manner as in EXAMPLE 28.

COMPARATIVE EXAMPLE 4

Evaluation was conducted in the same manner as in EXAMPLE 28 except that no liquid composition was applied.

Evaluation results as to the gas resistance and light fastness in EXAMPLES 28 to 31 are shown together with the results of COMPARATIVE EXAMPLE 4 in Table 7.

TABLE 7

| Example | Liquid composition | Gas resistance | Light fastness |
|---|---|---|---|
| EXAMPLE 28 | Liquid Composition 41 | 98 | 76 |
| EXAMPLE 29 | Liquid Composition 42 | 98 | 79 |
| EXAMPLE 30 | Liquid Composition 43 | 98 | 80 |
| EXAMPLE 31 | Liquid Composition 44 | 98 | 81 |
| COMPARATIVE EXAMPLE 4 | Blank | 19 | 73.5 |

As apparent from Table 7, the liquid compositions for ink-jet recording respectively containing the high-molecular copolymers obtained in Preparation Examples 4-1 to 4-4 were applied, whereby excellent light fastness was achieved.

The results that each liquid composition was applied on to the PET film to form a thin film, and a UV absorption spectrum was measured to calculate out the maximum absorption wavelength and the absorptivity coefficient are shown in Table 8.

TABLE 8

| | $\lambda max$ | Absorptivity coefficient |
|---|---|---|
| EXAMPLE 28 | 338.5 | 0.31 |
| EXAMPLE 29 | 338.5 | 1.56 |
| EXAMPLE 30 | 338.5 | 3.01 |
| EXAMPLE 31 | 338.5 | 5.98 |
| COMP. EXAMPLE 4 | No absorption appeared at 400 nm or shorter | |

EXAMPLES 32 TO 40

(Preparation 5 of Liquid Composition)

{Liquid Composition 5A}

A styrene-acrylic acid copolymer 5A (St/AA=70/30 (% by weight); molecular weight: 10,500; acid value: 206) synthesized by a solution polymerization process using a radical initiator was used to prepare Liquid Composition 5A of the following composition. Incidentally, potassium hydroxide was used as a basic substance, and the amount added was controlled in such a manner that the pH of each liquid composition is 8.0.

| Styrene-acrylic acid copolymer 6A | 3 parts |
|---|---|
| Glycerol | 7 parts |
| Diethylene glycol | 5 parts |
| Water | 85 parts. |

{Liquid Compositions 5B and 5C}

Liquid Compositions 5B and 5C were prepared in the same manner as in Liquid Composition 5A except that the styrene-acrylic acid copolymer was changed as shown in Table 9. In Table 9, St and AA indicate a styrene monomer and acrylic acid monomer, respectively.

(Production of Recording Medium)

{Recording Medium 5A}

Aluminum sec-butoxide was prepared in accordance with the process described in U.S. Pat. No. 4,242,271. A 75% mixed solution of this aluminum sec-butoxide in sec-butyl alcohol was hydrolyzed at 85° C. with a mixed solution of sec-butyl alcohol containing 30% of water to obtain an alumina slurry. After the alumina slurry was aged at 125° C. for 3 hours in an electromagnetically stirring autoclave, water was immediately added to the alumina slurry until a solids content was 20%, and the thus-treated alumina slurry was cooled. The pH of the alumina slurry was adjusted with a 3.8% aqueous solution of nitric acid to obtain Alumina Hydrate 6A. Alumina hydrate A obtained by drying colloidal sol of this alumina hydrate was determined by X-ray diffractometry and found to have a pseudoboehmite structure. At this time, the BET specific surface area was 175 m$^2$/g, and the pore volume was 0.65 ml/g. Incidentally, the specific surface area and pore volume were determined by the following respective methods.
1) Pore volume (PV): determined by means of "AUTOSORB I" (trade name, manufactured by Quantachrome Co.) in accordance with the nitrogen adsorption and desorption method after a sample was subjected to a degassing treatment at 120° C. for 24 hours.
2) BET specific surface area (SA): calculated out in accordance with the method of Brunauer, et al.

Polyvinyl alcohol PVA117 (trade name, product of Kuraray Co., Ltd.) was dissolved in purified water to obtain a 9% solution. Colloidal sol of the alumina hydrate A was concentrated to obtain a 17% solution. The colloidal sol of the alumina hydrate A and the polyvinyl alcohol solution were mixed with each other so as to give a weight ratio of 10:1 in terms of solids and stirred to obtain a dispersion. After a 5% aqueous solution of sodium borate was applied on to a baryta layer of a base material having the baryta layer in advance by an air knife coater so as to give a coating weight of 10 g/m$^2$, the above-prepared dispersion was further applied by a die coater so as to give a dry coating weight of 30 g/m$^2$. The base material used at this time was obtained by applying a baryta composition composed of 100 parts of barium sulfate and 10 parts of gelatin on to a fibrous base having a basis weight of 150 g/m$^2$ and a Stöckigt sizing degree of 200 seconds so as to give a dry coating weight of 30 g/m$^2$ and calendaring it.

The surface of the ink-receiving layer provided on the base material having the baryta layer was subjected to a rewet casting treatment with hot water (80° C.) by means of a rewet cast coater to obtain a glossy recording medium. Polyethylene was additionally laminated on a back side of the base material by an extrusion laminator so as to give a coating weight of 20 g/m$^2$. The surface pH of the recording medium was 7.2.

An aqueous solution of nitric acid was applied on to the recording medium obtained in the above-described manner by a wire bar and dried to obtain Recording Medium 5A.

{Recording Media 5B to 5D}

Recording Media 5B to 5D were obtained in the same manner as in Recording Medium 5A except that alumina hydrates 5B to 5D obtained by changing the temperature and aging time upon the synthesis of the alumina hydrate used in Recording Medium 5A as shown in Table 10 were respectively used.

(Preparation of Recording Liquid Containing Coloring Material)

{Recording Liquid 5A}

Recording Liquid 5A of the following composition was prepared.

Ink Composition:

| Dye (Y, M C or Bk) | 5 parts |
|---|---|
| Ethylene glycol | 10 parts |
| Polyethylene glycol | 10 parts |
| Water | 75 parts. |

Dyes for Inks:
Y: C.I. Acid Yellow 23
M: C.I. Acid Red 52
C: C.I. Direct Blue 199
Bk: C.I. Food Black 2.

{Recording Liquid 5B}

Recording Liquid 5B of the following composition was prepared.

Ink Composition:

| Dye (Y, M C or Bk) | 5 parts |
|---|---|
| Ethylene glycol | 10 parts |
| Polyethylene glycol | 10 parts |
| Acetylenol EH (product of Kawaken Fine Chemicals Co., Ltd.) | 2 parts |
| Water | 73 parts. |

Dyes for Inks:
Y: C.I. Acid Yellow 23
M: C.I. Acid Red 52
C: C.I. Direct Blue 199
Bk: C.I. Food Black 2.

The liquid compositions, recording liquids, recording media and coating layer forming process were combined as shown in Tables 9, 10 and 11 to conduct the following evaluation.

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (100%) and secondary color printing (200%) with color inks of the above-described respective compositions.

(Formation of Coating Layer; Ink-jet Process)

Upon elapsed time of 5 seconds and 60 seconds after printing with the recording liquids respectively containing the above-described coloring materials, solid printing (200%) with the liquid composition was conducted in the same manner as described above so as to completely cover the sites at which solid printing had been conducted with the respective color inks.

(Formation of Coating Layer; Coating Process)

Upon elapsed time of 5 seconds and 60 seconds after printing with the recording liquids respectively containing the above-described coloring materials, the liquid composition was applied in an amount of 20 g/m² by a roll coater (RC) so as to completely cover the sites at which solid printing had been conducted with the respective color inks.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100(%)

(Stickiness of Coating Layer)

A sticky feel of each image-recorded article after formation of the coating layer produced above was evaluated in accordance with the following standard.
  A: No sticky feel existed after 20 seconds from formation of the coating layer;
  B: A sticky feel somewhat existed after 20 seconds from formation of the coating layer, but disappeared after 60 seconds;
  C: A sticky feel existed even after 60 seconds from formation of the coating layer.

(Coloring Ability)

OD (optical density) of the monochromatic solid print portion (100%) of black in each image-recorded article after formation of the coating layer produced above was measured (by 310TR manufactured by X-Rite Co.).

(Bleeding)

Bleeding at an edge portion of each solid printed image formed above was visually evaluated in accordance with the following standard.
  A: No bleeding occurred in the secondary solid printing (200%);
  B: No bleeding occurred in the monochromatic solid printing (100%);
  C: Bleeding occurred in the monochromatic solid printing (100%).

(Beading)

Beading of each solid printed image formed above was visually evaluated in accordance with the following standard.
  A: No beading occurred in the secondary solid printing (200%);
  B: No beading occurred in the monochromatic solid printing (100%);
  C: Beading occurred in the monochromatic solid printing (100%).

TABLE 9

| Liquid composition | 5A | 5B | 5C |
|---|---|---|---|
| St/AA | 70/30 | 62/38 | 55/45 |
| Acid value | 206 | 252 | 297 |
| Molecular weight | 10,500 | 9,000 | 13,000 |

TABLE 10

| Recording medium | 5A | 5B | 5C | 5D |
|---|---|---|---|---|
| Alumina hydrate | 5A | 5B | 5C | 5D |
| BET specific surface area (m²/g) | 175 | 198 | 227 | 149 |
| Pore volume (ml/g) | 0.65 | 0.57 | 0.51 | 0.7 |

TABLE 11

| | Example | | | | | | | | |
|---|---|---|---|---|---|---|---|---|---|
| | Ex. 32 | Ex. 33 | Ex. 34 | Ex. 35 | Ex. 36 | Ex. 37 | Ex. 38 | Ex. 39 | Ex. 40 |
| Liquid composition | 5A | 5B | 5B | 5B | 5B | 5C | 5A | 5A | 5C |
| Recording liquid | 5A | 5A | 5B | 5A | 5A | 5B | 5A | 5A | 5A |
| Recording medium | 5A | 5B | 5B | 5C | 5D | 5B | 5A | 5C | 5B |
| Kα1 | 1 | 1.1 | 1.1 | 0.5 | 1.5 | 0.8 | 1 | 0.3 | 2 |
| Kα2 | 2.5 | 1.5 | 1 | 0.5 | 3 | 1 | 2.5 | 0.5 | 1.5 |
| Kα1/Kα2 | 0.4 | 0.73 | 1.1 | 1 | 0.5 | 0.8 | 0.4 | 0.6 | 1.3 |
| Coating layer forming process (after 5 seconds) | IJ | IJ | IJ | IJ | IJ | IJ | RC | IJ | IJ |
| Gas resistance | 99% | 99% | 99% | 99% | 99% | 99% | 99% | 99% | 99% |
| Sticky feel | A | A | A | A | A | A | A | B | A |
| OD | 2.12 | 2.28 | 1.95 | 2.22 | 2.04 | 2.00 | 2.12 | 2.37 | 1.87 |
| Beading | A | A | A | B | A | A | A | B | A |
| Bleeding | A | A | B | B | A | A | A | B | B |

TABLE 11-continued

|  | Example | | | | | | | | |
|---|---|---|---|---|---|---|---|---|---|
|  | Ex. 32 | Ex. 33 | Ex. 34 | Ex. 35 | Ex. 36 | Ex. 37 | Ex. 38 | Ex. 39 | Ex. 40 |
| Coating layer forming process (after 60 seconds) | IJ | IJ | IJ | IJ | IJ | IJ | RC | IJ | IJ |
| Gas resistance | 99% | 99% | 99% | 99% | 99% | 99% | 99% | 99% | 99% |
| Sticky feel | A | A | A | A | A | A | A | B | A |
| OD | 2.09 | 2.28 | 2.31 | 2.43 | 2.01 | 1.98 | 2.05 | 2.46 | 1.92 |
| Beading | A | A | A | B | A | A | A | B | A |
| Bleeding | A | A | A | A | A | A | A | A | A |

IJ: Ink-jet
RC: Roll coating

EXAMPLES 41 TO 49

(Preparation 1 of Liquid Composition)

{Liquid Composition 6A}

A styrene-acrylic acid copolymer 6A (St (styrene)/AA (acrylic acid)=70/30 (% by weight); molecular weight: 10,000; acid value: 201) synthesized by a solution polymerization process using a radical initiator was used to prepare Liquid Composition 6A of the following composition. Incidentally, potassium hydroxide was used as a basic substance, and the amount added was controlled in such a manner that the pH of each liquid composition is 8.0.

| Styrene-acrylic acid copolymer 6A | 3 parts |
|---|---|
| Glycerol | 7 parts |
| Diethylene glycol | 5 parts |
| Water | 85 parts. |

{Liquid Compositions 6B and 6C}

Liquid Compositions 6B and 6C were prepared in the same manner as in Liquid Composition 6A except that the styrene-acrylic acid copolymer was changed as shown in Table 12.

(Production of Recording Medium)

{Recording Medium 6A}

Disperal HP13 (trade name; product of CONDEA Co.) as an alumina hydrate was mixed with purified water to prepare a dispersion containing 5% of solids. Hydrochloric acid was then added to the dispersion to adjust the pH of the dispersion to 4. After stirring the dispersion for a while, the dispersion was heated to 95° C. with stirring and kept for 2 hours at the same temperature. The pH of the dispersion was adjusted to 9.5 with caustic soda, and the dispersion was then kept for 8 hours with stirring. After 8 hours, the temperature of the dispersion was cooled down to room temperature, and the pH thereof was adjusted to 7.2. Thereafter, a desalting treatment was conducted, and acetic acid was added to conduct a deflocculating treatment, thereby obtaining colloidal sol. Alumina hydrate obtained by drying the colloidal sol of this alumina hydrate was determined by X-ray diffractometry and found to have a pseudoboehmite structure. At this time, the BET specific surface area was 150.2 m²/g, and the pore volume was 0.68 ml/g. Incidentally, the specific surface area and pore volume were determined by the following respective methods.

1) Pore volume (PV): determined by means of "AUTOSORB I" (trade name, manufactured by Quantachrome Co.) in accordance with the nitrogen adsorption and desorption method after a sample was subjected to a degassing treatment at 120° C. for 24 hours.
2) BET specific surface area (SA): calculated out in accordance with the method of Brunauer, et al.

Polyvinyl alcohol PVA117 (trade name, product of Kuraray Co., Ltd.) was dissolved in purified water to obtain a 9% solution. Colloidal sol of the alumina hydrate obtained above was concentrated to obtain a 17% solution. The colloidal sol of the alumina hydrate and the polyvinyl alcohol solution were mixed with each other so as to give a weight ratio of 10:1 in terms of solids and stirred to obtain a dispersion.

After a 5% aqueous solution of sodium borate was applied on to a baryta layer of a base material having the baryta layer in advance by an air knife coater so as to give a coating weight of 10 g/m², the above-prepared dispersion was further applied by a die coater so as to give a dry coating weight of 30 g/m². The base material used at this time was obtained by applying a baryta composition composed of 100 parts of barium sulfate and 10 parts of gelatin on to a fibrous base having a basis weight of 150 g/m² and a Stöckigt sizing degree of 200 seconds so as to give a dry coating weight of 30 g/m² and calendaring it.

The surface of the ink-receiving layer provided on the base material having the baryta layer was subjected to a rewet casting treatment with hot water (80° C.) by means of a rewet cast coater to obtain a glossy recording medium. Polyethylene was additionally laminated by an extrusion laminator so as to give a coating weight of 20 g/m². An aqueous solution of calcium chloride was applied on to this recording medium by a wire bar and dried to obtain Recording Medium 6A adjusted to a polyvalent metal ion concentration of 0.01 (mol/L).

{Recording Media 6B to 6E}

Recording Media 6B to 6E were obtained in the same manner as in Recording Medium 6A except that calcium chloride (polyvalent metal salt) and polyvalent metal ion concentration in Recording Medium 6A were changed as shown in Table 12.

EXAMPLES 41 TO 49

The liquid compositions and the recording media were combined as shown in Table 12 to make the following evaluation. In each recorded article obtained, it was confirmed by observation of its section through a scanning electron microscope that a thin film having its corresponding thickness shown in Table 12 is formed. The results are shown in Table 12.

EXAMPLES 50 TO 52

When the content of the styrene-acrylic acid copolymer in Liquid Composition 6A used in EXAMPLE 41 was changed to 6 parts (Liquid Composition 6D, EXAMPLE 50), 1.0 part (Liquid Composition 6E, EXAMPLE 51) and 0.2 parts (Liquid Composition 6F, EXAMPLE 52), respectively, the thickness of the thin film layer was changed to 970 nm, 50 nm and 20 nm, respectively.

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (90% and 100%) and secondary color printing (200%) with color inks of the following respective compositions.

Ink Composition:

| | |
|---|---|
| Dye (Y, M C or Bk) | 5 parts |
| Ethylene glycol | 10 parts |
| Polyethylene glycol | 10 parts |
| Water | 75 parts. |

Dyes for Inks:
  Y: C.I. Acid Yellow 23
  M: C.I. Acid Red 52
  C: C.I. Direct Blue 199
  Bk: C.I. Food Black 2.

(Formation of Coating Layer; Ink-jet Process)

After printing with the recording liquids respectively containing the above-described coloring materials, solid printing (200%) with the liquid composition was conducted in the same manner as described above so as to completely cover the sites at which solid printing had been conducted with the respective color inks.

(Formation of Coating Layer; Coating Process)

After printing with the recording liquids respectively containing the above-described coloring materials, the liquid composition was applied in an amount of 20 g/m² by a roll coater so as to completely cover the sites at which solid printing had been conducted with the respective color inks.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

(Tint)

The tint of the monochromatic solid print portions (90% and 100%) of cyan prepared above was visually evaluated in accordance with the following standard.

A: The tint was not changed at the 100% cyan solid print portion;
B: The tint was not changed at the 90% cyan solid print portion;
C: The tint was somewhat reddish at the 90% cyan solid print portion.

TABLE 12

| | EXAMPLE 41 | EXAMPLE 42 | EXAMPLE 43 | EXAMPLE 44 | EXAMPLE 45 | EXAMPLE 46 |
|---|---|---|---|---|---|---|
| Liquid composition | 6A | 6C | 6B | 6A | 6A | 6A |
| St/AA | 70/30 | 80/20 | 55/45 | 70/30 | 70/30 | 70/30 |
| Molecular weight | 10,000 | 9,000 | 12,000 | 10,000 | 10,000 | 10,000 |
| Recording medium | 6B | 6A | 6C | 6H | 6D | 6E |
| Polyvalent metal salt | $Ca(NO_3)_2$ | $CaCl_2$ | $CaCl_2$ | $CaCl_2$ | $Mg(NO_3)_2$ | $Y(NO_3)_3$ |
| Polyvalent metal ion concentration (mg/g) | 4.0 | 0.5 | 100 | 50 | 4.0 | 4.0 |
| Process for forming coating layer | Ink-jet | Ink-jet | Ink-jet | Ink-jet | Ink-jet | Ink-jet |
| Thickness of coating layer (nm) | 350 | 220 | 510 | 450 | 390 | 410 |
| Gas resistance (%) | 98 | 97 | 92 | 98 | 98 | 98 |
| Tint | A | A | B | A | A | A |

| | EXAMPLE 47 | EXAMPLE 48 | EXAMPLE 49 | EXAMPLE 50 | EXAMPLE 51 | EXAMPLE 52 |
|---|---|---|---|---|---|---|
| Liquid composition | 6A | 6A | 6A | 6D | 6E | 6F |
| St/AA | 70/30 | 70/30 | 70/30 | 70/30 | 70/30 | 70/30 |
| Molecular weight | 10,000 | 10,000 | 10,000 | 10,000 | 10,000 | 10,000 |
| Recording medium | 6F | 6G | 6B | 6B | 6B | 6B |
| Polyvalent metal salt | $ZrO(CH_3COO)_2$ | $La(NO_3)_3$ | $Ca(NO_3)_2$ | $Ca(NO_3)_2$ | $Ca(NO_3)_2$ | $Ca(NO_3)_2$ |
| Polyvalent metal ion concentration (mg/g) | 4.0 | 4.0 | 4.0 | 4.0 | 4.0 | 4.0 |
| Process for forming coating layer | Ink-jet | Ink-jet | Roll coating | Ink-jet | Ink-jet | Ink-jet |
| Thickness of coating layer (nm) | 340 | 380 | 330 | 970 | 50 | 20 |
| Gas resistance (%) | 98 | 98 | 98 | 99 | 90 | 70 |
| Tint | A | A | A | A | A | A |

EXAMPLES 53 TO 57

(Preparation of Liquid Composition)

{Liquid Composition 7A}

A styrene-acrylic acid copolymer 7A (St/AA=80/20 (% by weight); molecular weight: 10,000; actual acid value: 132) synthesized by a solution polymerization process using a radical initiator was used to prepare Liquid Composition 7A of the following composition. Incidentally, potassium hydroxide was used as a basic substance, and the amount added was controlled in such a manner that the pH of each liquid composition is 8.0.

| | |
|---|---|
| Styrene-acrylic acid copolymer 7A | 3 parts |
| Glycerol | 7 parts |
| Diethylene glycol | 5 parts |
| Water | 84 parts |
| BC-30TX (polyoxyethylene cetyl ether (EO 30), product of Nippon Surfactant Kogyo K.K.) | 1 part. |

{Liquid Composition 7B}

Liquid Composition 7B was prepared in the same manner as in Liquid Composition 7A except that a benzyl acrylate-acrylic acid copolymer 7B (BzA/AA=90/10 (% by weight); molecular weight: 11,000; actual acid value: 70) synthesized by a solution polymerization process using a radical initiator was used in place of the styrene-acrylic acid copolymer 7A.

{Liquid Composition 7C}

Liquid Composition 7C was prepared in the same manner as in Liquid Composition 7A except that an n-butyl methacrylate-acrylic acid copolymer 7C (nBMA/AA=80/20 (% by weight); molecular weight: 10,500; actual acid value: 130) synthesized by a solution polymerization process using a radical initiator was used in place of the styrene-acrylic acid copolymer 7A.

{Liquid Composition 7D}

The n-butyl methacrylate-acrylic acid copolymer 7C was used to prepare Liquid Composition 7D of the following composition. Incidentally, potassium hydroxide was used as a basic substance, and the amount added was controlled in such a manner that the pH of each liquid composition is 8.0.

| | |
|---|---|
| n-Butyl methacrylate-acrylic acid copolymer 7C | 3 parts |
| Glycerol | 7 parts |
| Diethylene glycol | 5 parts |
| Water | 84.95 parts |
| BC-30TX (polyoxyethylene cetyl ether (EO 30), product of Nippon Surfactant Kogyo K.K.) | 0.05 parts. |

{Liquid Composition 7E}

The n-butyl methacrylate-acrylic acid copolymer 7C was used to prepare Liquid Composition 7E of the following composition. Incidentally, potassium hydroxide was used as a basic substance, and an amount added was controlled in such a manner that the pH of each liquid composition is 8.0.

| | |
|---|---|
| n-Butyl methacrylate-acrylic acid copolymer 7C | 3 parts |
| Glycerol | 7 parts |
| Diethylene glycol | 5 parts |
| Water | 84 parts |
| BC-5 (polyoxyethylene cetyl ether (EO 5), product of Nippon Surfactant Kogyo K.K.) | 1 part. |

(Recording Medium)

The Recording Medium 6B used in EXAMPLE 41 was used.

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (100%) with color inks of the following respective compositions, and solid printing (200%) was then conducted with the liquid composition so as to completely cover the sites at which solid printing had been conducted with the respective color inks.

Ink Composition:

| | |
|---|---|
| Dye (Y, M C or Bk) | 4 parts |
| Ethylene glycol | 5 parts |
| Glycerol | 10 parts |
| Ethyleneurea | 5 parts |
| Water | 76 parts. |

Dyes for Inks:
Y: C.I. Direct Yellow 86
M: C.I. Acid Red 52
C: C.I. Direct Blue 199
Bk: C.I. Food Black 2.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

(Ejection Stability)

An ink-jet recording head evaluation apparatus CANVAS (trade name, manufactured by Canon Inc.) and a printing head for Canon Printer BJF-660 were used to judge a scatter of ejection velocity between the respective inks under the same conditions as head driving conditions for printing by the printer.
A: At most 1 m/s;
B: 1 to 2 m/s;
C: 2 to 4 m/s;
D: At least 4 m/s.

EXAMPLES 53 TO 57

The above evaluation was made by combining the liquid composition and the recording medium as shown in Table 13.

TABLE 13

|  | EXAMPLE 53 | EXAMPLE 54 | EXAMPLE 55 | EXAMPLE 56 | EXAMPLE 57 |
|---|---|---|---|---|---|
| Liquid composition | Liquid Composition 7A | Liquid Composition 7B | Liquid Composition 7C | Liquid Composition 7D | Liquid Composition 7E |
| Recording medium | Recording Medium 6B | Recording Medium 6B | Recording Medium 6B | Recording Medium 6B | Recording Medium 6B |
| Gas resistance (%) | 98 | 99 | 86 | 81 | 82 |
| Ejection stability | A | A | A | B | B |

EXAMPLES 58 TO 64

(Preparation of Liquid Composition)

{Liquid Composition 8A}

An n-butyl acrylate-acrylic acid copolymer (nBA/AA=85/15 (% by weight); molecular weight: 10,000) and a styrene-acrylic acid copolymer (St/AA=70/30 (% by weight); molecular weight: 10,000) synthesized by a solution polymerization process using a radical initiator were used to prepare Liquid Composition 8A of the following composition. Incidentally, potassium hydroxide was used as a basic substance, and an amount added was controlled in such a manner that the pH of each liquid composition is 8.0.

| | |
|---|---|
| n-Butyl acrylate-acrylic acid copolymer | 1.5 parts |
| Styrene-acrylic acid copolymer | 1.5 parts |
| Glycerol | 7 parts |
| Diethylene glycol | 5 parts |
| Water | 85 parts. |

(Recording Medium)

Recording Media 6A to 6C respectively used in EXAMPLES 41 to 43 were used.

(EXAMPLES 58 TO 60)

The liquid compositions and the recording media were combined as shown in Table 15 to make the following evaluation. In each recorded article obtained, it was confirmed by observation of its section through a scanning electron microscope that a coating layer having its corresponding thickness shown in Table 15 is formed. The results are shown in Table 15.

EXAMPLES 61 AND 62

The content of the n-butyl acrylate-acrylic acid copolymer in Liquid Composition 8A was changed to 8 parts (Liquid Composition 8B) and 0.5 parts (Liquid Composition 8C), respectively, to make the following evaluation in combination with the respective recording media shown in Table 15. The results are shown in Table 15.

{Liquid Composition 8D}

Liquid Composition 8D was prepared in the same manner as in Liquid Composition 8A except that the n-butyl acrylate-acrylic acid copolymer in Liquid Composition 8A was changed to a 2-ethylhexyl acrylate-acrylic acid copolymer (2EHA/AA=85/15 (% by weight); molecular weight: 10,000).

Incidentally, preparation conditions for the respective liquid compositions are shown in Table 14.

EXAMPLE 63

The liquid composition and the recording medium were combined as shown in Table 15 to make the following evaluation. The results are shown in Table 15.

EXAMPLE 64

After printing on Recording Medium 6B, Liquid Composition 8A was applied by a wire bar. At this time, it was confirmed that a coating layer having a thickness of 0.34 μm and an impregnated layer having a thickness of 1.0 μm are formed on the surface and in the interior of the surface layer, respectively. This recorded article was evaluated by the following respective evaluation methods. As a result, the gas resistance was 98%, and both rub-off resistance and tint were good (A).

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (90% and 100%) and secondary color printing (200%) with color inks of the following respective compositions, and solid printing (200%) with the liquid composition was then conducted in the same manner as described above so as to completely cover the sites at which solid printing had been conducted with the respective color inks.

Ink Composition:

| | |
|---|---|
| Dye (Y, M C or Bk) | 5 parts |
| Ethylene glycol | 10 parts |
| Polyethylene glycol | 10 parts |
| Water | 75 parts. |

Dyes for Inks:
  Y: C.I. Acid Yellow 23
  M: C.I. Acid Red 52
  C: C.I. Direct Blue 199
  Bk: C.I. Food Black 2.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

(Rub-off Resistance)

After the monochromatic solid print portion (100%) of black prepared above was rubbed 5 times with silbon paper under a load of 40 g/cm², the above-described test as to the gas resistance was conducted to visually evaluate it as to the rub-off resistance in accordance with the following standard.
  A: No scratch-like discoloration occurred at the rubbed portion;
  B: Scratch-like discoloration was slightly observed at the rubbed portion, but it was not observed when viewed 30 cm away;
  C: Scratch-like discoloration was observed at the rubbed portion even when viewed 30 cm away.

(Tint)

The tint of the monochromatic solid print portions (90% and 100%) of cyan prepared above was visually evaluated in accordance with the following standard.
  A: The tint was not changed at the 100% cyan solid print portion;
  B: The tint was not changed at the 90% cyan solid print portion;
  C: The tint was somewhat reddish at the 90% cyan solid print portion.

EXAMPLES 65 TO 70

<Recording Medium>

Recording Medium 6B used in EXAMPLE 41 was used.

<Preparation Example of Water-Soluble High-Molecular Copolymer Related to Liquid Composition>

PREPARATION EXAMPLE 9-1

A reactor equipped with a stirrer and a reflux condenser was charged with 150 g of PGM that is a polymerization solvent, and the contents were heated to the reflux temperature while introducing nitrogen gas and stirring them. A dropping funnel charged with 70.0 g of benzyl methacrylate and 30.0 g of methacrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a colorless and transparent solution. The actual acid value and weight average molecular weight of the polymer were 172 and 9,700, respectively.

TABLE 14

|  | Polymer 1 | | | Polymer 2 | | |
| --- | --- | --- | --- | --- | --- | --- |
|  | Composition | Molecular weight | Amount added (parts) | Composition | Molecular weight | Amount added (parts) |
| Liquid Composition 8A | nBA/AA = 85/15 | 10,000 | 1.5 | St/AA = 70/30 | 10,000 | 1.5 |
| Liquid Composition 8B | nBA/AA = 85/15 | 10,000 | 8 | St/AA = 70/30 | 10,000 | 1.5 |
| Liquid Composition 8C | nBA/AA = 85/15 | 10,000 | 0.5 | St/AA = 70/30 | 10,000 | 1.5 |
| Liquid Composition 8D | 2EHA/AA = 85/15 | 9,000 | 1.5 | St/AA = 70/30 | 10,000 | 1.5 |

TABLE 15

|  | Ex. 58 | Ex. 59 | Ex. 60 | Ex. 61 | Ex. 62 | Ex. 63 | Ex. 64 |
| --- | --- | --- | --- | --- | --- | --- | --- |
| Liquid composition | 8A | 8A | 8A | 8B | 8C | 8D | 8A |
| Recording medium | 6B | 6A | 6C | 6B | 6B | 6B | 6B |
| Thickness of coating layer on recording medium surface (μm) | 0.33 | 0.15 | 0.43 | 0.32 | 0.32 | 0.33 | 0.34 |
| Thickness of coating layer within recording medium (μm) | 1 | 1.2 | 0.7 | 1.3 | 0.2 | 0.4 | 1 |
| Gas resistance | 98 | 98 | 98 | 99 | 95 | 94 | 98 |
| Rub-off resistance | A | A | A | A | B | A | A |
| Tint | A | A | A | A | A | A | A |

PREPARATION EXAMPLE 9-2

A reactor equipped with a stirrer and a reflux condenser was charged with 150 g of PGM that is a polymerization solvent, and the contents were heated to the reflux temperature while introducing nitrogen gas and stirring them. A dropping funnel charged with 80.0 g of cyclohexyl acrylate and 20.0 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 23.1 g of 48% caustic soda and 200 g of ion-exchanged water were added to conduct neutralization. The thus-obtained aqueous polymer solution was a colorless and transparent solution. The actual acid value and weight average molecular weight of the polymer were 126 and 7,100, respectively.

PREPARATION EXAMPLE 9-3

A reactor equipped with a stirrer and a reflux condenser was charged with 150 g of PGM that is a polymerization solvent, and the contents were heated to a reflux temperature while introducing nitrogen gas and stirring them. A dropping funnel charged with 68.0 g of styrene and 32.0 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 18.5 g of 48% caustic soda and 200 g of ion-exchanged water were added to conduct neutralization. The thus-obtained aqueous polymer solution was a pale yellow and transparent solution. The actual acid value and weight average molecular weight of the polymer were 205 and 7,900, respectively.

PREPARATION EXAMPLE 9-4

A reactor equipped with a stirrer and a reflux condenser was charged with 150 g of PGM that is a polymerization solvent, and the contents were heated to the reflux temperature while introducing nitrogen gas and stirring them. A dropping funnel charged with 84.0 g of butyl methacrylate and 16.0 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 37.0 g of 48% caustic soda and 200 g of ion-exchanged water were added to conduct neutralization. The thus-obtained aqueous polymer solution was a pale yellow and transparent solution. The actual acid value and weight average molecular weight of the polymer were 115 and 9,500, respectively.

PREPARATION EXAMPLE 9-5

A reactor equipped with a stirrer and a reflux condenser was charged with 150 g of PGM that is a polymerization solvent, and the contents were heated to a reflux temperature while introducing nitrogen gas and stirring them. A dropping funnel charged with 65 g of styrene, 15 g of n-butyl acrylate and 20 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 23.1 g of 48% caustic soda and 200 g of ion-exchanged water were added to conduct neutralization. The thus-obtained aqueous polymer solution was a pale yellow and transparent solution. The actual acid value and weight average molecular weight of the polymer were 145 and 10,500, respectively.

PREPARATION EXAMPLE 9-6

A reactor equipped with a stirrer and a reflux condenser was charged with 150 g of PGM that is a polymerization solvent, and the contents were heated to a reflux temperature while introducing nitrogen gas and stirring them. A dropping funnel charged with 85 g of n-butyl acrylate and 15 g of acrylic acid was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 17.3 g of 48% caustic soda and 200 g of ion-exchanged water were added to conduct neutralization. The thus-obtained aqueous polymer solution was a pale yellow and transparent solution. The actual acid value and weight average molecular weight of the polymer were 108 and 10,200, respectively.

<Preparation of Liquid Composition>

Liquid Composition 9A:

The water-soluble high-molecular copolymer obtained in Preparation Example 9-1 was mixed with glycerol, diethylene glycol, trimethylolpropane and ion-exchanged water at a mass ratio described below, and the resultant mixture was stirred for 30 minutes. Thereafter, the mixture was filtered through a membrane filter having a pore size of 0.2 μm to prepare Liquid Composition 9A.

Glycerol: 7%

Diethylene glycol: 5%

Trimethylolpropane: 7%

Water-soluble high-molecular copolymer obtained in Preparation Example 9-1: 3% (in terms of solids concentration of the polymer)

Ion-exchanged water: 78%.

The following Liquid Compositions 9B to 9F were prepared in accordance with the preparation process of Liquid Composition 9A.

Liquid Composition 9B:
 Glycerol: 7%
 Diethylene glycol: 5%
 Trimethylolpropane: 7%
 Water-soluble high-molecular copolymer obtained in Preparation Example 9-2: 3% (in terms of solids concentration of the polymer)
 Ion-exchanged water: 78%.

Liquid Composition 9C:
 Glycerol: 7%
 Diethylene glycol: 5%
 Trimethylolpropane: 7%
 Water-soluble high-molecular copolymer obtained in Preparation Example 9-3: 3% (in terms of solids concentration of the polymer)
 Ion-exchanged water: 78%.

Liquid Composition 9D:
 Glycerol: 7%
 Diethylene glycol: 5%
 Trimethylolpropane: 7%
 Water-soluble high-molecular copolymer obtained in Preparation Example 9-4: 3% (in terms of solids concentration of the polymer)
 Ion-exchanged water: 78%.

Liquid Composition 9E:
 Glycerol: 7%
 Diethylene glycol: 5%
 Trimethylolpropane: 7%
 Water-soluble high-molecular copolymer obtained in Preparation Example 9-5: 3% (in terms of solids concentration of the polymer)
 Ion-exchanged water: 78%.

Liquid Composition 9F:
 Glycerol: 7%
 Diethylene glycol: 5%
 Trimethylolpropane: 7%
 Water-soluble high-molecular copolymer obtained in Preparation Example 9-6: 3% (in terms of solids concentration of the polymer)
 Ion-exchanged water: 78%.

Liquid Composition 9G:
 Liquid Composition 9G was prepared in the same manner as in Liquid Composition 9A in accordance with the following composition.
 Glycerol: 7%
 Diethylene glycol: 5%
 Trimethylolpropane: 7%
 POVAL (polymerization degree 100): 3% (in terms of solids concentration of the polymer)
 Ion-exchanged water: 78%.

EXAMPLES 65 TO 70 AND COMPARATIVE EXAMPLE 5

Liquid Compositions 9A to 9G were evaluated according to the following method. The results are shown in Table 16.

COMPARATIVE EXAMPLE 6

Recording Medium 6B was used as a blank as it is (without applying any liquid composition).

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (100%) and secondary color printing (200%) with color inks of the following respective compositions, and solid printing (200%) was then conducted with the liquid composition so as to completely cover the sites at which solid printing had been conducted with the respective color inks. Further, solid printing (200%) with the liquid composition was also conducted on a non-printed portion.

Ink Composition:

| | |
|---|---|
| Dye (Y, M C or Bk) | 4 parts |
| Ethylene glycol | 5 parts |
| Glycerol | 10 parts |
| Ethyleneurea | 5 parts |
| Water | 76 parts. |

Dyes for Inks:
 Y: C.I. Direct Yellow 86
 M: C.I. Acid Red 52
 C: C.I. Direct Blue 199
 Bk: C.I. Food Black 2.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

TABLE 16

| | Liquid composition | Gas resistance |
|---|---|---|
| EXAMPLE 65 | Liquid Composition 9A | 99 |
| EXAMPLE 66 | Liquid Composition 9B | 99 |
| EXAMPLE 67 | Liquid Composition 9C | 98 |
| EXAMPLE 68 | Liquid Composition 9D | 72 |
| EXAMPLE 69 | Liquid Composition 9E | 95 |
| EXAMPLE 70 | Liquid Composition 9F | 70 |
| COMP. EXAMPLE 5 | Liquid Composition 9G | 31 |
| COMP. EXAMPLE 6 | Blank | 19 |

EXAMPLE 71 AND COMPARATIVE EXAMPLE 7

Liquid compositions containing the high-molecular copolymer obtained in Preparation Example 9-1 in amounts of 1.0 part, 3.0 parts, 6.0 parts and 15.0 parts respectively were prepared in accordance with the following respective compositions (EXAMPLE 71).

The liquid composition containing the high-molecular copolymer obtained in Preparation Example 9-1 in an amount of 1.0 part was prepared in accordance with the following composition.
Glycerol: 7%
Diethylene glycol: 5%
Trimethylolpropane: 7%
Water-soluble high-molecular copolymer obtained in Preparation Example 9-1: 1% (in terms of solids concentration of the polymer)
Ion-exchanged water: 80%.

The liquid composition containing the high-molecular copolymer obtained in Preparation Example 9-1 in an amount of 6.0 parts was prepared in accordance with the following composition.
Glycerol: 7%
Diethylene glycol: 5%
Trimethylolpropane: 7%
Water-soluble high-molecular copolymer obtained in Preparation Example 9-1: 6% (in terms of solids concentration of the polymer)
Ion-exchanged water: 75%.

The liquid composition containing the high-molecular copolymer obtained in Preparation Example 9-1 in an amount of 15.0 parts was prepared in accordance with the following composition.
Glycerol: 7%
Diethylene glycol: 5%
Trimethylolpropane: 7%
Water-soluble high-molecular copolymer obtained in Preparation Example 9-1: 15% (in terms of solids concentration of the polymer)
Ion-exchanged water: 66%.

Liquid compositions (COMPARATIVE EXAMPLE 7) containing polyvinyl alcohol (polymerization degree: 100) were prepared in the same manner as in EXAMPLE 71.

The respective liquid compositions and Recording Medium 6B were combined to conduct the above-described evaluation. The results are shown in Table 17.

TABLE 17

| | Kind of high-molecular copolymer | Concentration of high-molecular copolymer (parts) | Gas resistance |
|---|---|---|---|
| EXAMPLE 71 | High-molecular copolymer obtained in Preparation Example 9-1 | 1.0 | 98 |
| | | 3.0 | 99 |
| | | 6.0 | 99 |
| | | 15.0 | 99 |
| COMPARATIVE EXAMPLE 7 | Polyvinyl alcohol (polymerization degree: 100) | 1.0 | 28 |
| | | 3.0 | 31 |
| | | 6.0 | 32 |
| | | 15.0 | 31 |

EXAMPLES 72 TO 75

<Recording Medium>
Recording Medium 6B used in EXAMPLE 41 was used.

<Preparation Example of Water-soluble High-molecular Copolymer Related to Liquid Composition>

PREPARATION EXAMPLE 10-1

A reactor equipped with a stirrer and a reflux condenser was charged with 150 g of PGM that is a polymerization solvent, and the contents were heated to the reflux temperature while introducing nitrogen gas and stirring them. A dropping funnel charged with 69.0 g of styrene, 30.0 g of methacrylic acid and 1.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a colorless and transparent solution.

PREPARATION EXAMPLE 10-2

A reactor equipped with a stirrer and a reflux condenser was charged with 150 g of PGM that is a polymerization solvent, and the contents were heated to a reflux temperature while introducing nitrogen gas and stirring them. A dropping funnel charged with 65.0 g of styrene, 30.0 g of methacrylic acid and 5.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a colorless and transparent solution.

PREPARATION EXAMPLE 10-3

A reactor equipped with a stirrer and a reflux condenser was charged with 150 g of PGM that is a polymerization solvent, and the contents were heated to a reflux temperature while introducing nitrogen gas and stirring them. A dropping funnel charged with 60.0 g of styrene, 30.0 g of methacrylic acid and 10.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a pale yellow and transparent solution.

PREPARATION EXAMPLE 10-4

A reactor equipped with a stirrer and a reflux condenser was charged with 150 g of PGM that is a polymerization solvent, and the contents were heated to the reflux temperature while introducing nitrogen gas and stirring them. A dropping funnel charged with 50.0 g of styrene, 30.0 g of methacrylic acid and 20.0 g of 2-(2'-hydroxy-5'-methacryloxyethylphenyl)-2H-benzotriazole was separately provided. In addition, a dropping funnel charged with 100 g of PGM and 2.0 g of a polymerization initiator, tert-butyl peroxybenzoate was separately provided. The respective contents in these 2 dropping funnels were added dropwise into the reactor over 2 hours. After completion of the addition, the reaction mixture was kept for 2 hours at a temperature of from 70 to 80° C. Thereafter, the introduction of nitrogen gas was stopped, and the solvent, PGM was removed outside the system by steam distillation, and 29.1 g of 48% caustic soda and 200 g of ion-exchanged water were added to conduct neutralization. The thus-obtained aqueous polymer solution was a pale yellow and transparent solution.

<Preparation of Liquid Composition>

Liquid Composition 10A:

The water-soluble high-molecular copolymer obtained in Preparation Example 10-1 was mixed with glycerol, diethylene glycol, trimethylolpropane and ion-exchanged water at a mass ratio described below, and the resultant mixture was stirred for 30 minutes. Thereafter, the mixture was filtered through a membrane filter having a pore size of 0.2 μm to prepare Liquid Composition 10A.

Glycerol: 7%
Diethylene glycol: 5%
Trimethylolpropane: 7%
Water-soluble high-molecular copolymer obtained in Preparation Example 10-1: 3% (in terms of solids concentration of the polymer)
Ion-exchanged water: 78%.

EXAMPLE 72

An ink-jet printer (BJF870, trade name, manufactured by Canon Inc.) was used to conduct momochromatic printing (100%) on Recording Medium 6B used in EXAMPLE 41 with color inks of the following respective compositions, and solid printing (200%) with Liquid Composition 10A was then conducted so as to completely cover the sites at which solid printing had been conducted with the respective color inks. The thus-obtained recorded article was evaluated as to gas resistance and light fastness in accordance with the following respective methods. Further, UV absorption spectrophotometry was also conducted.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

(Light Fastness)

The monochromatic solid print portion (100%) of magenta prepared above was subjected to an exposure test as to light fastness by means of a fluorescent lamp light fastness tester under the following conditions. The light fastness was evaluated in terms of a rate (%) of change of the image density after the light fastness test.

Light fastness (%)=(Image density after the fluorescent lamp test/Image density before the fluorescent lamp test)×100 (%)

Test Conditions:
Light quantity irradiated: 70 klx
Test time: 520 hours
Temperature and humidity within test chamber: 24° C., 60% RH
Filter: soda lime.

(UV Absorption Spectrophotometry)

Liquid Composition 10A prepared above was applied on to a PET film to form a thin film, and a UV absorption spectrum (U-3300, manufactured by Hitachi Ltd.) was measured by using the PET film as a blank. As a result, the maximum absorption wavelength was 338.5 nm, and the absorbance was 0.15. Further, as a result of observation through SEM, the film thickness was found to be 0.48 μm, so that an absorptivity coefficient "e" calculated out therefrom was 0.31.

(Preparation of Liquid Compositions 10B to 10D)

Liquid Compositions 10B to 10D were prepared in the same manner as in Liquid Composition 10A in accordance with the following respective compositions.

Liquid Composition 10B:
Glycerol: 7%
Diethylene glycol: 5%
Trimethylolpropane: 7%
Water-soluble high-molecular copolymer obtained in Preparation Example 10-2: 3% (in terms of solids concentration of the polymer)
Ion-exchanged water: 78%.

Liquid Composition 10C:
Glycerol: 7%
Diethylene glycol: 5%
Trimethylolpropane: 7%
Water-soluble high-molecular copolymer obtained in Preparation Example 10-3: 3% (in terms of solids concentration of the polymer)
Ion-exchanged water: 78%.

Liquid Composition 10D:
Glycerol: 7%
Diethylene glycol: 5%
Trimethylolpropane: 7%
Water-soluble high-molecular copolymer obtained in Preparation Example 10-4: 3% (in terms of solids concentration of the polymer)
Ion-exchanged water: 78%.

EXAMPLES 73 TO 75

EXAMPLES 73 to 75 were performed in the same manner as in EXAMPLE 72 except that Liquid Composition 10A in EXAMPLE 72 was changed as shown in Table 18.

COMPARATIVE EXAMPLE 8

Evaluation was conducted in the same manner as in EXAMPLE 72 except that Liquid Composition 10A was not applied.

Evaluation results as to the gas resistance and light fastness in EXAMPLES 72 to 75 are shown together with the results of COMPARATIVE EXAMPLE 8 in Table 18.

TABLE 18

| Example | Liquid composition | Gas resistance | Light fastness |
|---|---|---|---|
| EXAMPLE 72 | Liquid Composition 10A | 98 | 76 |
| EXAMPLE 73 | Liquid Composition 10B | 98 | 79 |
| EXAMPLE 74 | Liquid Composition 10C | 98 | 80 |
| EXAMPLE 75 | Liquid Composition 10D | 98 | 81 |
| COMPARATIVE EXAMPLE 8 | Blank | 19 | 73.5 |

As apparent from Table 18, the liquid compositions respectively containing the high-molecular copolymers obtained in Preparation Examples 10-1 to 10-4 were applied, whereby excellent light fastness was achieved.

The results that each liquid composition was applied on to the PET film to form a thin film, and a UV absorption spectrum was measured to calculate out the maximum absorption wavelength and the absorptivity coefficient are shown in Table 19.

TABLE 19

| | λmax | Absorptivity coefficient |
|---|---|---|
| EXAMPLE 72 | 338.5 | 0.31 |
| EXAMPLE 73 | 338.5 | 1.56 |
| EXAMPLE 74 | 338.5 | 3.01 |
| EXAMPLE 75 | 338.5 | 5.98 |
| COMP. EXAMPLE 8 | | No absorption appeared at 400 nm or shorter |

EXAMPLES 76 TO 84

(Preparation of Liquid Composition)

{Liquid Composition 11A}

A styrene-acrylic acid copolymer 11A (St/AA=70/30 (% by weight); molecular weight: 10,500; acid value: 206) synthesized by a solution polymerization process using a radical initiator was used to prepare Liquid Composition 11A of the following composition. Incidentally, potassium hydroxide was used as a basic substance, and an amount added was controlled in such a manner that the pH of each liquid composition is 8.0.

| Styrene-acrylic acid copolymer 11A | 3 parts |
|---|---|
| Glycerol | 7 parts |
| Diethylene glycol | 5 parts |
| Water | 85 parts. |

{Liquid Compositions 11B and 11C}

Liquid Compositions 11B and 11C were prepared in the same manner as in Liquid Composition 11A except that the styrene-acrylic acid copolymer was changed as shown in Table 21.

(Production of Recording Medium)

{Recording Medium 11A}

Aluminum sec-butoxide was prepared in accordance with the process described in U.S. Pat. No. 4,242,271. A 75% mixed solution of this aluminum sec-butoxide in sec-butyl alcohol was hydrolyzed at 85° C. with a mixed solution of sec-butyl alcohol containing 30% of water to obtain an alumina slurry. After the alumina slurry was aged at 125° C. for 3 hours in an electromagnetically stirring autoclave, water was immediately added to the alumina slurry until a solids content was 20%, and the thus-treated alumina slurry was cooled. The pH of the alumina slurry was adjusted with a 3.8% aqueous solution of nitric acid to obtain Alumina Hydrate 6A. Alumina hydrate A obtained by drying colloidal sol of this alumina hydrate was determined by X-ray diffractometry and found to have a pseudoboehmite structure. At this time, the BET specific surface area was 175 m²/g, and the pore volume was 0.65 ml/g. Incidentally, the specific surface area and pore volume were determined by the following respective methods.

1) Pore volume (PV): determined by means of "AUTOSORB I" (trade name, manufactured by Quantachrome Co.) in accordance with the nitrogen adsorption and desorption method after a sample was subjected to a degassing treatment at 120° C. for 24 hours.
2) BET specific surface area (SA): calculated out in accordance with the method of Brunauer, et al.

Polyvinyl alcohol PVA117 (trade name, product of Kuraray Co., Ltd.) was dissolved in purified water to obtain a 9% solution. Colloidal sol of the alumina hydrate A was concentrated to obtain a 17% solution. The colloidal sol of the alumina hydrate A and the polyvinyl alcohol solution were mixed with each other so as to give a weight ratio of 10:1 in terms of solids and stirred to obtain a dispersion.

After a 5% aqueous solution of sodium borate was applied on to a baryta layer of a base material having the baryta layer in advance by an air knife coater so as to give a coating weight of 10 g/m², the above-prepared dispersion was further applied by a die coater so as to give a dry coating weight of 30 g/m². The base material used at this time was obtained by applying a baryta composition composed of 100 parts of barium sulfate and 10 parts of gelatin on to a fibrous base having a basis weight of 150 g/m² and a Stöckigt sizing degree of 200 seconds so as to give a dry coating weight of 30 g/m² and calendaring it.

The surface of the ink-receiving layer provided on the base material having the baryta layer was subjected to a rewet casting treatment with hot water (80° C.) by means of a rewet cast coater to obtain a glossy recording medium. Polyethylene was additionally laminated on a back side of the base material by an extrusion laminator so as to give a coating weight of 20 g/m².

A 4% aqueous solution of calcium chloride was applied on to the recording medium prepared in the above-described manner by a wire bar and dried to obtain Recording Medium 11A adjusted to a polyvalent metal ion concentration of 0.15 mol/L.

{Recording Media 11B to 11D}

Recording Media 11B to 11D were obtained in the same manner as in Recording Medium 11A except that alumina hydrates 11B to 11D obtained by changing the temperature and aging time in the synthesis of the alumina hydrate used in Recording Medium 11A as shown in Table 10 were respectively used.

(Preparation of Recording Liquid Containing Coloring Material)

{Recording Liquid 11A}

Recording Liquid 11A of the following composition was prepared.

Ink Composition:

| Dye (Y, M C or Bk) | 5 parts |
|---|---|
| Ethylene glycol | 10 parts |
| Polyethylene glycol | 10 parts |
| Water | 75 parts. |

Dyes for Inks:
 Y: C.I. Acid Yellow 23
 M: C.I. Acid Red 52
 C: C.I. Direct Blue 199
 Bk: C.I. Food Black 2.

{Recording Liquid 11B}

Recording Liquid 11B of the following composition was prepared.

Ink Composition:

| Dye (Y, M C or Bk) | 5 parts |
|---|---|
| Ethylene glycol | 10 parts |
| Polyethylene glycol | 10 parts |
| Acetylenol EH (product of Kawaken Fine Chemicals Co., Ltd.) | 2 parts |
| Water | 73 parts. |

Dyes for Inks:
 Y: C.I. Acid Yellow 23
 M: C.I. Acid Red 52
 C: C.I. Direct Blue 199
 Bk: C.I. Food Black 2.

EXAMPLES 76 TO 84

The liquid compositions, recording liquids, recording media and coating layer forming process were combined as shown in Tables 20, 21 and 22 to conduct the following evaluation.

(Evaluation Method)

(Printing)

An ink-jet recording apparatus (BJF660, trade name, manufactured by Canon Inc.) having an On-Demand type multi-recording head, which ejects an ink by applying thermal energy to the ink in response to recording signals, was used to conduct momochromatic printing (100%) and secondary color printing (200%) with color inks of the above-described respective compositions.

(Formation of Coating Layer; Ink-jet Process)

Upon elapsed time of 5 seconds and 60 seconds after printing with the recording liquids respectively containing the above-described coloring materials, solid printing (200%) with the liquid composition was conducted in the same manner as described above so as to completely cover the sites at which solid printing had been conducted with the respective color inks.

(Formation of Coating Layer; Coating Process)

Upon elapsed time of 5 seconds and 60 seconds after printing with the recording liquids respectively containing the above-described coloring materials, the liquid composition was applied in an amount of 20 g/m² by a roll coater so as to completely cover the sites at which solid printing had been conducted with the respective color inks.

(Gas Resistance)

The monochromatic solid print portion (100%) of black prepared above was placed in an ozone exposure tester (manufactured by SUGA TEST INSTRUMENTS CO., LTD.) and exposed to ozone at a concentration of 3 ppm for 6 hours under conditions of 23° C. and 60% RH to evaluate the print as to gas resistance in terms of a rate (%) of change of the image density after the ozone exposure test.

Gas resistance (%)=(Image density after the ozone exposure test/Image density before the ozone exposure test)×100 (%)

(Stickiness of Coating Layer)

A sticky feel of each image-recorded article after formation of the coating layer produced above was evaluated in accordance with the following standard.

A: No sticky feel existed after 20 seconds from formation of the coating layer;
 B: A sticky feel somewhat existed after 20 seconds from formation of the coating layer, but disappeared after 60 seconds;
 C: A sticky feel existed even after 60 seconds from formation of the coating layer.

(Coloring Ability)

OD (optical density) of the monochromatic solid print portion (100%) of black in each image-recorded article after formation of the coating layer produced above was measured (by 310TR manufactured by X-Rite Co.).

(Bleeding)

Bleeding at an edge portion of each solid printed image formed above was visually evaluated in accordance with the following standard.

A: No bleeding occurred in the secondary solid printing (200%);
 B: No bleeding occurred in the monochromatic solid printing (100%);
 C: Bleeding occurred in the monochromatic solid printing (100%).

(Beading)

Beading of each solid printed image formed above was visually evaluated in accordance with the following standard.

A: No beading occurred in the secondary solid printing (200%);
 B: No beading occurred in the monochromatic solid printing (100%);
 C: Beading occurred in the monochromatic solid printing (100%)

TABLE 20

| | Liquid composition | | |
|---|---|---|---|
| | 11A | 11B | 11C |
| St/AA | 70/30 | 62/38 | 55/45 |
| Acid value | 206 | 252 | 297 |
| Molecular weight | 10,500 | 9,000 | 13,000 |

TABLE 21

| | Recording medium | | | |
|---|---|---|---|---|
| | 11A | 11B | 11C | 11D |
| | | Alumina hydrate | | |
| | 11A | 11B | 11C | 11D |
| BET specific surface area ($m^2/g$) | 175 | 198 | 212 | 130 |
| Pore volume (ml/g) | 0.65 | 0.57 | 0.52 | 0.72 |

TABLE 22

| | Example | | | | | | | | |
|---|---|---|---|---|---|---|---|---|---|
| | Ex. 76 | Ex. 77 | Ex. 78 | Ex. 79 | Ex. 80 | Ex. 81 | Ex. 82 | Ex. 83 | Ex. 84 |
| Liquid composition | 11A | 11B | 11B | 11B | 11B | 11C | 11A | 11A | 11C |
| Recording liquid | 11A | 11A | 11B | 11A | 11A | 11B | 11A | 11A | 11A |
| Recording medium | 11A | 11B | 11B | 11C | 11D | 11B | 11A | 11C | 11B |
| Kα1 | 0.9 | 0.9 | 1 | 0.5 | 1.5 | 0.8 | 0.9 | 0.3 | 1.8 |
| Kα2 | 2.5 | 1.5 | 1 | 0.6 | 3 | 1 | 2.5 | 0.6 | 1.5 |
| Kα1/Kα2 | 0.36 | 0.60 | 1.00 | 0.83 | 0.50 | 0.80 | 0.36 | 0.50 | 1.20 |
| Coating layer forming process (after 5 seconds) | IJ | IJ | IJ | IJ | IJ | IJ | RC | IJ | IJ |
| Gas resistance | 99% | 99% | 99% | 99% | 99% | 99% | 99% | 99% | 99% |
| Sticky feel | A | A | A | A | A | A | A | B | A |
| OD | 2.09 | 2.21 | 1.88 | 2.19 | 1.98 | 2.01 | 2.09 | 2.38 | 1.69 |
| Beading | A | A | A | B | A | A | A | B | A |
| Bleeding | A | A | B | B | A | A | A | B | B |
| Coating layer forming process (after 60 seconds) | IJ | IJ | IJ | IJ | IJ | IJ | RC | IJ | IJ |
| Gas resistance | 99% | 99% | 99% | 99% | 99% | 99% | 99% | 99% | 99% |
| Sticky feel | A | A | A | A | A | A | A | B | A |
| OD | 2.10 | 2.19 | 2.26 | 2.39 | 2.02 | 2.03 | 2.14 | 2.46 | 1.77 |
| Beading | A | A | A | B | A | A | A | B | A |
| Bleeding | A | A | A | A | A | A | A | A | A |

IJ: Ink-jet;
RC: Roll coating

According to the present invention, as described above, there can be provided a process for forming an image-recorded article excellent in gas resistance and rub-off resistance without causing clogging at an orifice at high speed by a miniaturized apparatus.

What is claimed is:

1. An image forming process for forming an image-recorded article having a coating layer on an image formed, which comprises the steps of
   providing a liquid composition containing an aqueous medium and a polymer having a structure represented by a general formula

—COOA wherein A is an alkali metal, ammonium or an organic ammonium, providing an image-recorded article formed on a recording medium having a surface pH which insolubilizes the polymer by an ink-jet recording method, and
   applying the liquid composition to the image-recorded article to form the coating layer on the image-recorded article.

2. The image forming process according to claim 1, wherein the recording medium has a porous ink-receiving layer, and the surface pH of the ink-receiving layer is within a range of from 5.4 to 7.0.

3. An image forming process for forming an image-recorded article having a coating layer on an image formed, which comprises the steps of
   providing a liquid composition containing an aqueous medium and a polymer having a structure represented by a general formula

—COOA wherein A is an alkali metal, ammonium or an organic ammonium, providing an image-recorded article formed on a recording medium containing a polyvalent metal ion which insolubilizes the polymer by an ink-jet recording method, and
   applying the liquid composition to the image-recorded article to form the coating layer on the image-recorded article.

4. The image forming process according to claim 3, wherein the recording medium has a porous ink-receiving layer, and the ink-receiving layer contains a polyvalent metal ion.

* * * * *

UNITED STATES PATENT AND TRADEMARK OFFICE
CERTIFICATE OF CORRECTION

PATENT NO. : 7,291,361 B2
APPLICATION NO. : 10/917304
DATED : November 6, 2007
INVENTOR(S) : Ogino et al.

It is certified that error appears in the above-identified patent and that said Letters Patent is hereby corrected as shown below:

ON THE COVER PAGE:
In item "(56) References Cited," under "FOREIGN PATENT DOCUMENTS," the first- and second-listed documents should be deleted.
In item "(56) References Cited," under "FOREIGN PATENT DOCUMENTS," the third-listed document, "EP   1 231 245 A1   *   8/2006" should read
--EP   1 231 245 A1   *   8/2002--.

COLUMN 1:
Line 18, "system that" should read --system in which--.
Line 26, "needlessness of" should read --reduced need for--.
Line 35, "recoding" should read --recording--.
Line 42, "medium" should read --media--.

COLUMN 4:
Line 24, "DRAWING" should read --DRAWINGS--.
Line 34, "recoding" should read --recording--.
Line 37, "of an" should read --an--.

COLUMN 10:
Line 12, "may arises" should read --may arise--.
Line 34, "or the lime" should read --or the like--.

COLUMN 12:
Line 41, "chains" should read --chain length--.
Line 43, "chains" should read --chain length--.
Line 67, "layer" should read --layer.--.

COLUMN 15:
Line 46, "$Al_2O_3.n(OH)_{2n}.mH_2O$" should read --$Al_2O_3 \cdot n(OH)_{2n} \cdot mH_2O$--.

COLUMN 17:
Line 57, "fed" should read --feed--.

UNITED STATES PATENT AND TRADEMARK OFFICE
CERTIFICATE OF CORRECTION

PATENT NO. : 7,291,361 B2
APPLICATION NO. : 10/917304
DATED : November 6, 2007
INVENTOR(S) : Ogino et al.

It is certified that error appears in the above-identified patent and that said Letters Patent is hereby corrected as shown below:

COLUMN 20:
Line 35, "momochromatic" should read --monochromatic--.

COLUMN 23:
Line 43, "momochromatic" should read --monochromatic--.

COLUMN 26:
Line 1, "momochromatic" should read --monochromatic--.

COLUMN 27:
Line 49, "ether." should read --ether--.

COLUMN 31:
Line 44, "momochromatic" should read --monochromatic--.

COLUMN 34:
Line 65, "momochromatic" should read --monochromatic--.

COLUMN 39:
Line 7, "momochromatic" should read --monochromatic--.

COLUMN 43:
Line 17, "momochromatic" should read --monochromatic--.

COLUMN 46:
Line 18, "momochromatic" should read --monochromatic--.

COLUMN 48:
Line 42, "momochromatic" should read --monochromatic--.

COLUMN 54:
Line 12, "momochromatic" should read --monochromatic--.

UNITED STATES PATENT AND TRADEMARK OFFICE
CERTIFICATE OF CORRECTION

PATENT NO. : 7,291,361 B2
APPLICATION NO. : 10/917304
DATED : November 6, 2007
INVENTOR(S) : Ogino et al.

It is certified that error appears in the above-identified patent and that said Letters Patent is hereby corrected as shown below:

COLUMN 57:
Line 40, "momochromatic" should read --monochromatic--.

COLUMN 61:
Line 50, "momochromatic" should read --monochromatic--.

Signed and Sealed this

Twenty-second Day of December, 2009

David J. Kappos
*Director of the United States Patent and Trademark Office*